(12) United States Patent
Lounsberry et al.

(10) Patent No.: US 11,762,980 B2
(45) Date of Patent: Sep. 19, 2023

(54) AUTONOMOUS SECRETS RENEWAL AND DISTRIBUTION

(71) Applicant: MICROSOFT TECHNOLOGY LICENSING, LLC, Redmond, WA (US)

(72) Inventors: Brian S. Lounsberry, Kenmore, WA (US); Ashok Chandrasekaran, Redmond, WA (US); Chetan S. Shankar, Bothell, WA (US); Chandan R. Reddy, Redmond, WA (US); Chuang Wang, Issaquah, WA (US); Kahren Tevosyan, Kirkland, WA (US); Mark Eugene Russinovich, Hunts Point, WA (US); Vyom P. Munshi, Bothell, WA (US); Pavel Zakharov, Sammamish, WA (US); Abhishek Pratap Singh Chauhan, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 796 days.

(21) Appl. No.: 15/920,832

(22) Filed: Mar. 14, 2018

(65) Prior Publication Data
US 2019/0286812 A1  Sep. 19, 2019

(51) Int. Cl.
*G06F 21/46* (2013.01)
*H04L 9/40* (2022.01)
(Continued)

(52) U.S. Cl.
CPC ............. *G06F 21/46* (2013.01); *G06F 21/10* (2013.01); *H04L 9/006* (2013.01); *H04L 9/083* (2013.01);
(Continued)

(58) Field of Classification Search
CPC ... H04L 63/0823; H04L 9/3263; H04L 63/06; H04L 63/062; H04L 9/08; H04L 9/0816;
(Continued)

(56) References Cited

U.S. PATENT DOCUMENTS

| 5,222,140 A | * | 6/1993 | Beller | H04L 9/0844 340/5.74 |
| 5,982,898 A | * | 11/1999 | Hsu | H04L 9/321 713/156 |

(Continued)

OTHER PUBLICATIONS

"Making Requests", Retreived From: https://web.archive.org/web/20121219143451/http:/docs.aws.amazon.com/AmazonS3/latest/dev/MakingRequests.html, Dec. 19, 2012, 3 Pages.
(Continued)

*Primary Examiner* — Richard A McCoy
(74) *Attorney, Agent, or Firm* — SHOOK, HARDY & BACON L.L.P.

(57) ABSTRACT

Various methods and systems are provided for autonomous orchestration of secrets renewal and distribution. A secrets management service ("SMS") can be utilized to store, renew and distribute secrets in a distributed computing environment. The secrets are initially deployed, after which, SMS can automatically renew the secrets according to a specified rollover policy, and polling agents can fetch updates from SMS. In various embodiments, SMS can autonomously rollover client certificates for authentication of users who access a security critical service, autonomously rollover storage account keys, track delivery of updated secrets to secrets recipients, deliver secrets using a secure blob, and/or facilitate autonomous rollover using secrets staging. In some embodiments, a service is pinned to the path where the service's secrets are stored. In this manner, secrets can be automatically renewed without any manual orchestration and/or the need to redeploy services.

7 Claims, 15 Drawing Sheets

(51) Int. Cl.
*G06F 21/10* (2013.01)
*H04L 9/00* (2022.01)
*H04L 9/08* (2006.01)

(52) U.S. Cl.
CPC .......... *H04L 9/0891* (2013.01); *H04L 63/062* (2013.01); *H04L 63/068* (2013.01); *H04L 63/107* (2013.01)

(58) Field of Classification Search
CPC ..... H04L 9/088; H04L 9/0891; H04L 9/0822; H04L 9/0819; H04L 63/068; H04L 63/065; H04L 63/0891
See application file for complete search history.

(56) References Cited

U.S. PATENT DOCUMENTS

| | | | |
|---|---|---|---|
| 6,178,529 B1* | 1/2001 | Short | G06F 11/2038 709/223 |
| 6,615,347 B1* | 9/2003 | de Silva | H04L 9/3263 713/156 |
| 7,174,549 B2* | 2/2007 | Yoo | G06F 8/60 717/174 |
| 7,853,791 B1* | 12/2010 | Jannu | H04L 67/2814 713/175 |
| 7,995,758 B1 | 8/2011 | Shapiro | |
| 8,908,868 B1* | 12/2014 | Baer | H04L 9/083 380/278 |
| 8,955,069 B1* | 2/2015 | Dotan | H04L 63/0861 726/6 |
| 9,118,487 B1* | 8/2015 | Robinson | H04L 63/0442 |
| 9,401,911 B2* | 7/2016 | Castelnuovo | H04L 63/0823 |
| 9,703,965 B1 | 7/2017 | Robinson et al. | |
| 9,722,804 B2 | 8/2017 | Miller et al. | |
| 10,250,453 B1* | 4/2019 | Singh | G06F 21/629 |
| 10,484,355 B1* | 11/2019 | Levy | H04L 9/3268 |
| 10,567,381 B1 | 2/2020 | Baer et al. | |
| 10,581,819 B1* | 3/2020 | Lototskiy | H04L 67/141 |
| 2002/0071563 A1 | 6/2002 | Kurn et al. | |
| 2002/0138577 A1* | 9/2002 | Teng | G06Q 10/10 709/205 |
| 2002/0143865 A1* | 10/2002 | Tung Loo | G06F 21/41 709/203 |
| 2003/0018830 A1* | 1/2003 | Chen | G06Q 10/06 719/328 |
| 2003/0037233 A1* | 2/2003 | Pearson | G06F 21/33 713/156 |
| 2003/0167355 A1* | 9/2003 | Smith | G06F 8/20 719/328 |
| 2004/0105549 A1* | 6/2004 | Suzuki | H04L 9/083 380/278 |
| 2005/0015491 A1 | 1/2005 | Koeppel | |
| 2005/0138352 A1* | 6/2005 | Gauvreau | H04L 9/3247 713/153 |
| 2006/0100888 A1* | 5/2006 | Kim | H04L 63/0823 705/67 |
| 2007/0094503 A1* | 4/2007 | Ramakrishna | H04L 63/18 713/172 |
| 2007/0198830 A1* | 8/2007 | Imai | H04L 63/0876 713/156 |
| 2007/0250839 A1* | 10/2007 | Van Der Sanden | G06F 9/54 719/315 |
| 2007/0253554 A1 | 11/2007 | Chesson et al. | |
| 2008/0019527 A1* | 1/2008 | Youn | H04L 9/083 380/278 |
| 2008/0292104 A1* | 11/2008 | Loc'H | H04L 9/0894 380/277 |
| 2009/0086977 A1* | 4/2009 | Berggren | H04L 9/0819 380/279 |
| 2009/0100075 A1 | 4/2009 | Karlsson | G06F 16/27 |
| 2009/0193507 A1* | 7/2009 | Ibrahim | H04W 12/0608 726/9 |
| 2009/0307496 A1* | 12/2009 | Hahn | H04L 63/083 713/171 |
| 2010/0115267 A1* | 5/2010 | Guo | H04L 9/3268 713/156 |
| 2010/0142542 A1* | 6/2010 | Van Wie | H04L 67/38 370/400 |
| 2011/0113239 A1* | 5/2011 | Fu | H04L 9/3226 713/156 |
| 2011/0154027 A1* | 6/2011 | Liu | H04L 9/3263 713/158 |
| 2011/0213967 A1* | 9/2011 | Wnuk | H04L 9/3268 713/158 |
| 2012/0096272 A1* | 4/2012 | Jasper | H04L 63/0853 713/176 |
| 2012/0114124 A1 | 5/2012 | Du et al. | |
| 2012/0124390 A1* | 5/2012 | Zipperer | G06F 21/10 713/189 |
| 2013/0036301 A1 | 2/2013 | Pelton et al. | |
| 2013/0103355 A1* | 4/2013 | Unagami | B60L 58/12 702/187 |
| 2013/0129095 A1 | 5/2013 | Fahrny et al. | |
| 2014/0075582 A1* | 3/2014 | Hierro | G06F 21/128 726/30 |
| 2014/0082701 A1 | 3/2014 | Pasion et al. | |
| 2014/0149745 A1 | 5/2014 | Suh et al. | |
| 2015/0052369 A1 | 2/2015 | Koning et al. | |
| 2015/0172739 A1* | 6/2015 | Shaw | H04N 21/4181 725/31 |
| 2015/0281233 A1 | 10/2015 | Asenjo et al. | |
| 2016/0105283 A1* | 4/2016 | Mityagin | H04L 9/12 380/279 |
| 2016/0212123 A1* | 7/2016 | Koster | H04L 63/0823 |
| 2016/0241405 A1* | 8/2016 | Jeong | H04L 63/0428 |
| 2016/0261407 A1 | 9/2016 | Hernandez et al. | |
| 2017/0033935 A1* | 2/2017 | Clark | H04L 9/3265 |
| 2017/0171191 A1 | 6/2017 | Cignetti et al. | |
| 2017/0171200 A1* | 6/2017 | Bao | H04L 9/3213 |
| 2017/0192414 A1* | 7/2017 | Mukkamala | H04L 63/0823 |
| 2017/0222981 A1 | 8/2017 | Srivastav et al. | |
| 2017/0244612 A1 | 8/2017 | Balakrishnan | |
| 2017/0272257 A1* | 9/2017 | Satoh | H04L 9/3268 |
| 2017/0331802 A1 | 11/2017 | Keshava et al. | |
| 2017/0339138 A1* | 11/2017 | Lewison | H04L 9/3239 |
| 2017/0371723 A1* | 12/2017 | Chrysanthakopoulos | H04L 67/104 |
| 2018/0041336 A1 | 2/2018 | Keshava et al. | |
| 2018/0048638 A1* | 2/2018 | Lewis | H04L 9/3268 |
| 2018/0054302 A1 | 2/2018 | Shveykin et al. | |
| 2018/0097817 A1 | 4/2018 | Aboubakr et al. | |
| 2018/0152297 A1* | 5/2018 | Fielding | H04L 9/3297 |
| 2018/0227182 A1 | 8/2018 | Patton et al. | |
| 2018/0324152 A1* | 11/2018 | Jarchafjian | H04W 4/023 |
| 2019/0129988 A1 | 5/2019 | Auer et al. | |
| 2019/0268148 A1 | 8/2019 | Sun et al. | |
| 2019/0286813 A1 | 9/2019 | Lounsberry et al. | |
| 2019/0288839 A1 | 9/2019 | Lounsberry et al. | |
| 2019/0288995 A1 | 9/2019 | Bose et al. | |
| 2020/0235945 A1* | 7/2020 | Li | H04L 9/3263 |

OTHER PUBLICATIONS

"Signing and Authenticating REST Requests", Retrieved From: https://web.archive.org/web/20121219143452/http://docs.aws.amazon.com/AmazonS3/latest/dev/RESTAuthentication.html, Dec. 19, 2012, 13 Pages.

"Temporary Security Credentials", Retreived From: https://web.archive.org/web/20150902005431/http://docs.aws.amazon.com/IAM/latest/UserGuide/id_credentials_temp.html, Sep. 2, 2015, 3 Pages.

Cljung, "Data Ingestion to Blob Storage using SAS-Tokens", Retreived From: http://www.redbaronofazure.com/?p=6791, Feb. 6, 2016, 7 Pages.

Dave, Jay, "What is the SharePoint Online Migration API?", Retreived From: https://www.metalogix.com/blog/speed-matters-using-the-azure-sharepoint-online-migration-pipeline, Jun. 3, 2015, 11 Pages.

Myers, et al., "Using shared access signatures (SAS)", Retreived From: https://docs.microsoft.com/en-us/azure/storage/common/storage-dotnet-shared-access-signature-part-1, Apr. 18, 2017, 18 Pages.

(56) References Cited

OTHER PUBLICATIONS

"International Search Report and Written Opinion Issued in PCT Application No. PCT/US19/020856", dated May 20, 2019, 16 Pages.

"International Search Report and Written Opinion Issued in PCT Application No. PCT/US19/020857", dated May 3, 2019, 12 Pages.

Srinath, et al., "Dynamic Key Generation Algorithm for User Authentication at Mobile Cloud Enviroinment", In International Journal of Science and Research, vol. 3, Issue 7, Jul. 2014, pp. 598-602.

Vunvulea, Radu, "Service Bus and Shared Access Signature (SAS)", Retreived From: http://vunvulearadu.blogspot.in/2013/09/service-bus-and-shared-access-signature.html, Sep. 10, 2013, 13 Pages.

Ebbo, David, "Automating Azure on your CI server using a Service Principal", Retrieved From «http://blog.davidebbo.com/2014/12/azure-service-principal.html», Dec. 16, 2014, 7 Pages.

Fitzmacken, et al., "Azure Resource Manager vs. classic deployment: Understand deployment models and the state of your resources", Retrieved From «https://azure.microsoft.com/en-us/documentation/articles/resource-manager-deployment-model/», Retrieved on: Nov. 15, 2017, 9 Pages.

Shahan, et al., "Constructing an Account SAS", Retrieved From «https://docs.microsoft.com/en-us/rest/api/storageservices/Constructing-an-Account-SAS?redirectedfrom=MSDN», Retrieved on: Nov. 15, 2017, 12 Pages.

"Notice of Allowance Issued in U.S. Appl. No. 15/920,827", dated Dec. 3, 2020, 9 Pages.

Mishra, et al., "A Key Renewal Model for Wireless Sensor Network Under Node Capture Attack", In Proceedings of Fourth International Conference on Emerging Trends in Engineering & Technology, Nov. 18, 2011, pp. 301-305.

"Non-Final Office Action Issued in U.S. Appl. No. 15/920,827", dated Jun. 15, 2020, 12 Pages.

"Notice of Allowance Issued in U.S. Appl. No. 15/920,821", dated Jun. 24, 2020, 9 Pages.

"Non Final Office Action Issued in U.S. Appl. No. 17/456,925", dated Mar. 28, 2023, 16 Pages.

"Notice of Allowance Issued in European Patent Application No. 19712380.5", dated Mar. 29, 2023, 8 Pages.

"Notice of Allowance Issued in European Patent Application No. 19712651.9", dated Apr. 12, 2023, 8 Pages.

U.S. Pat. No. 10,965,457, filed Mar. 30, 2021.
U.S. Publication No. 2022-0083643-A1, filed Mar. 17, 2022.
U.S. Pat. No. 10,819,701, filed Oct. 27, 2020.
U.S. Pat. No. 10,691,790, filed Jun. 23, 2020.

\* cited by examiner

AUTONOMOUS SECRETS RENEWAL AND DISTRIBUTION

BACKGROUND

Generally, secrets such as certificates, passwords, storage account keys, shared access signatures (SAS), and the like have a life cycle. At the end of life, the secret can expire or otherwise become invalid and/or untrusted. As such, secrets need to be renewed from time to time. In systems, such as data centers in which resources such as secrets can be distributed, managing such distributed secrets poses various challenges.

SUMMARY

Techniques herein relate to autonomous secrets renewal and distribution and may be implemented in a distributed computing environment. A secrets management service can be utilized to store, renew and distribute secrets such as certificates, storage account keys, shared access signatures, connection strings, custom types, and the like. In the context of distributed computing, a datacenter secrets management service ("dSMS") can orchestrate secrets renewal and distribution within the distributed computing environment. When a customer sets up a desired service, the customer can onboard secrets for the service to the dSMS. In some embodiments, a corresponding service model and/or configuration file for the service references the secrets by their path in dSMS. The secrets are initially deployed, for example on a node or virtual machine running the service, after which, dSMS can automatically renew the secrets according to the specified rollover policy, and polling agents for an associated service can fetch updates from dSMS. In this manner, secrets can be automatically renewed without manual orchestration and/or the need to redeploy services.

In one example scenario, a secrets management service such as dSMS can be utilized to autonomously rollover client certificates. After onboarding the secrets into dSMS, a client app and a corresponding service app can fetch renewed certificates from dSMS. In some embodiments, dSMS distributes multiple versions of a client certificate to facilitate an attempted authentication using a prior version of the certificate. Additionally and/or alternatively, when dSMS renews a certificate, dSMS can implement a secrets release delay, waiting for a configurable time period to deliver the renewed certificate to the client app, while advertising the renewed certificate to the server. As such, a secrets release delay can provide a service app with time to pick up the renewed certificate before releasing it to the client app.

In another example scenario, a secrets management service such as dSMS can be utilized to autonomously rollover storage account keys. Generally, primary and secondary keys for a storage account are rolled over on a predefined schedule in an interleaving fashion. In an example in which keys have a two year expiration, every year, either the primary or the secondary key is renewed and distributed. dSMS can generate a dependent shared access signature using a designated active key which has farther expiration. In some embodiments, when an expiring storage account key is rolled over, dSMS can regenerate any dependent shared access signatures using the other key prior to rolling over the expiring key.

In some embodiments, a secrets management service such as dSMS can track delivery of updated secrets to secrets recipients. For example, dSMS can maintain a repository which tracks the state of agents operating on each secrets recipient in a computing fabric, updating the state based on information in a periodic polling request. Additionally and/or alternatively, dSMS can maintain a repository which tracks the state of a particular rollover. When delivery of a renewed secret to all the agents configured to receive it has been confirmed, the rollover can be designated complete.

In some embodiments, a secrets management service such as dSMS can be utilized to autonomously rollover secrets for services sharing secrets with other services across regional or other scope boundaries. For example, a cross-scope secrets management service can be utilized to orchestrate renewal and distribution of secrets across scope boundaries. In some embodiments, locally scoped secrets management services subscribe to receive updates from the cross-scope secrets management service. As secrets are renewed, they are automatically propagated to the subscribing local scope and distributed by the local secrets management service.

In some embodiments, a secrets management service such as dSMS can deliver secrets to a service application using a secure Binary Large Object ("blob"), which is an encrypted structured binary sequence of data. For example, dSMS can generate a secrets package including a secure blob which contains secrets managed by dSMS for a particular service. In some embodiments, dSMS includes some certificates in the secrets package outside of the secure blob. Advantageously, the secure blob is encrypted during transport and stored encrypted. In some embodiments, the secure blob and/or a corresponding service object can be version controlled. As such, when a polling request indicates a particular agent needs an update based on a current version used by the agent, dSMS can reply with the latest secrets package and/or secure blob.

In some embodiments, autonomous secrets rollover includes secret staging, which can be implemented on a client, a service, or both. In a client-side staging model, a secrets management service such as dSMS pushes renewed secrets to a container, and the secrets are securely cached in a staged mode. A corresponding application and/or an external orchestration engine can determine when to begin using the secret, and can trigger the unstaging of the secret for active use. In a service side-staging model, a secrets management service such as dSMS rotates secrets one update domain at a time.

As such, autonomous secrets rollover can be achieved using the autonomous orchestration techniques for secrets renewal and distribution described herein. A secrets management service, such as dSMS, can achieve autonomous secrets rollover in a distributed computing environment. In various embodiments, dSMS can autonomously rollover client certificates for authentication of users who access a security critical service, autonomously rollover storage account keys, track the delivery of updated secrets to secrets recipients, autonomously rollover secrets for services sharing secrets with other services across regional or other scope boundaries, deliver secrets to a service application using a secure blob, and/or facilitate autonomous rollover using secrets staging.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
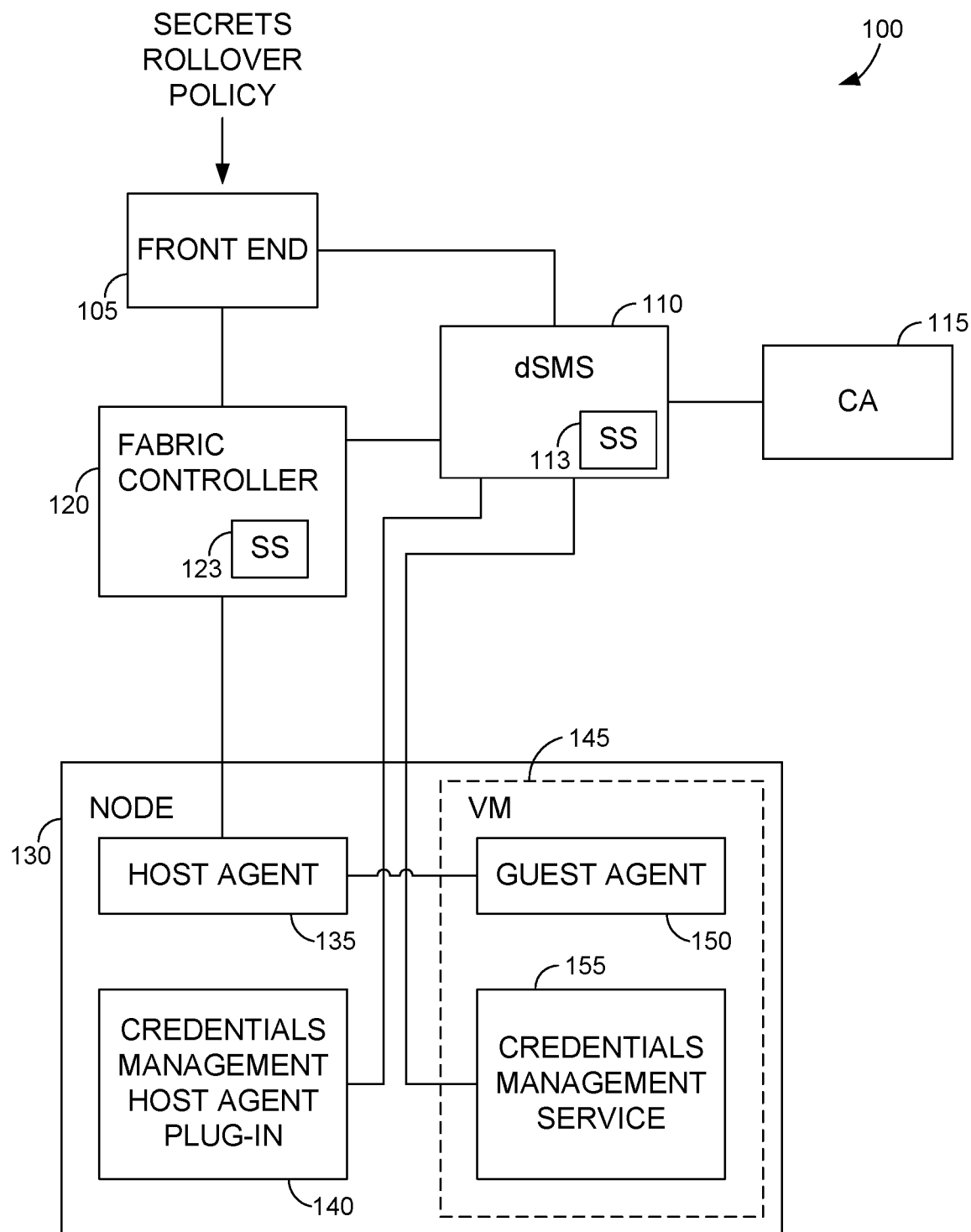
FIG. 1 is a block diagram of an autonomous secrets management system, in accordance with embodiments described herein.

In conventional datacenters, techniques for managing secrets have several shortcomings. Current systems today pin a specific value of the secret based on credential type. For example, conventional systems generally pin the thumbprint of a certificate or a unique global name of a storage account key in the system. Further, rotating specific values through a distributed environment is challenging and computationally complex, and generally requires manual orchestration. For example, a customer administrator might manually renew secrets and ship them as deployed assets throughout a large distributed service running on physical nodes or virtual machines ("VM"). Before a service can make use of a renewed secret, the service needs to be manually configured to utilize the renewed secret, and the reconfigured service needs to be redeployed. This process may be repeated for multiple services across multiple regions which share secrets. These techniques require significant human intervention, which can be time consuming, inefficient, and susceptible to human error.

Relying on manual orchestration of secrets renewal can create various problems. For example, if a manual rollover has not been completed before a secret expires, a system outage can occur in which partners within the system cannot communicate because they have different versions of a secret. Such a system outage can occur even when a manual rollover occurs in a timely fashion, for example, because conventional techniques lack reporting systems to monitor the status of a rollover in progress. As such, despite beginning a rollover in a timely manner, the underlying secret may still expire before the rollover completely finishes. In some cases, the result may not be an outage, but may result in a security non-compliance. As such, processes to support autonomous secrets management are integral to the deployment of secrets in a distributed environment.

Embodiments described herein provide simple and efficient methods and systems for implementing autonomous secrets renewal and distribution. Generally, a secrets management service that stores secrets, such as certificates (e.g., chained, self-signed, imported, etc.), storage account keys, shared access signatures ("SAS"), connection strings, custom types, and the like, can be deployed. In the context of distributed computing, a datacenter secrets management service ("dSMS") can be deployed to orchestrate secrets renewal and rollover within the distributed computing environment. A customer can define a secrets rollover policy for a particular distributed computing service to enable the service to create secrets in dSMS and reference the secrets in a corresponding service model by path in dSMS. The secrets required by the service are deployed to corresponding VMs and/or nodes by the distributed computing platform (e.g., computing fabric). dSMS can monitor the expiration of secrets and automatically renew secrets according to the defined rollover policy. Additionally and/or alternatively to auto-renewal, dSMS can renew a secret in response to a request for an on-demand rollover (e.g., during a breach scenario). VMs and/or nodes can run an agent that periodically polls dSMS to check if any of the secrets installed on the VMs and/or nodes have been renewed in dSMS. If a secret has been renewed, the renewed secret can be provided by dSMS and installed locally on the corresponding VMs and/or nodes. For some secrets, such as server SSL/TLS certificates, new versions can be linked to a previous version such that subsequent requests to the endpoint (container, app, node, etc.) automatically use the new certificates.

A secrets management service, such as dSMS, can be utilized in other scenarios besides a distributed computing environment. For example, dSMS can be utilized to autonomously rollover client certificates for authentication of users who access a security critical service ("service app"). A client app can be onboarded into dSMS so required can be deployed into the client app. The client app and/or service app can fetch renewed certificates using the polling technique described above. For example, a private key for a client certificate may be provided to the client app via a trusted endpoint of dSMS, while a public key may be provided to the service app in response to an anonymous call to a public endpoint of dSMS. In some embodiments, the service app is provided with the public certificate and its corresponding location in order to whitelist the certificate. When the client app connects to the service app, the client app provides the latest copy of the public certificate to the service app. If the public certificate is in the service app's whitelist, validation succeeds. Otherwise, the client app can retry with a prior version of the public certificate. Meanwhile, the service app can poll dSMS for an updated public certificate. Additionally and/or alternatively, the service app can include a worker thread which periodically polls dSMS for updates. In some embodiments, when dSMS renews the client certificate, dSMS can implement a secrets release delay, waiting for a configurable time period to deliver the renewed private key to the client app, while advertising the renewed public key to the server. As such, a secrets release delay can provide a service app with time to pick up the renewed public key before dSMS releases the renewed private key to the client app.

In some embodiments, a secrets management service such as dSMS can be utilized to autonomously rollover storage account keys. Generally, primary and secondary keys for a storage account are rolled over on a predefined schedule in an interleaving fashion. More specifically, the expiration of the primary key is separate from the expiration of the secondary key, and a customer can specify the renewal period in dSMS. In an example in which keys have a two year expiration, every year, either the primary or the secondary key is renewed and distributed. Any shared access signatures ("SASes") which depend upon a storage account key can be generated and/or rolled over based on the expirations of the storage account keys. For example, dSMS can generate an SAS using the key which has farther expiration (i.e. the key which is valid for the longer period of time). Moreover, any SASes which depend on an expiring storage account key can be rolled over prior to rolling over the key upon which they depend. For example, if an expiring storage account key is being rolled over, dSMS can regenerate any dependent SASes using the other key prior to rolling over the expiring key. In this manner, rollover and expiration are predictable, and rollover can be performed without breaking a communication scheme.

In some embodiments, a secrets management service, such as dSMS, can track the delivery of updated secrets to secrets recipients. To accomplish this, dSMS can track the internal state of a secrets recipient (e.g., secret not delivered, secret delivered, secret confirmed), and update the state when the recipient polls dSMS. For example, dSMS can maintain a repository which tracks the state of agents operating on each secrets recipient in fabric. When an agent polls dSMS, it provides dSMS with secrets metadata (e.g., version, path, etc.). As such, dSMS can determine and update the internal state for the agent and/or distribute a renewed secret in the event the agent is using a prior version. Additionally and/or alternatively, dSMS can maintain a repository which tracks the state of a particular rollover (e.g., rollover started, rollover completed). When delivery of a renewed secret to all the agents configured to receive it has been confirmed, the rollover can be designated complete. In this manner, dSMS can track rollover progress and fire off desired alerts.

In some embodiments, a secrets management service, such as dSMS, can be utilized to autonomously rollover secrets for services sharing secrets with other services across regional or other scope boundaries. Generally, a cross-scope secrets management service can be utilized to renew and distribute secrets across scope boundaries. The cross-scope secrets management service can be deployed with a replication scope (e.g., global, specific region, etc.) with which secrets are shared. Locally scoped (e.g., regional) secrets management services can subscribe to receive updates from the cross-scope secrets management service. As secrets are renewed, they are automatically propagated to the subscribing local scope and distributed by the local secrets management service. In some embodiments, a rollover request received at a regional dSMS can trigger an on-demand fetch request to obtain the most recent secret from a cross-scope dSMS. State tracking can be performed across the composite cross-scope and local secrets management services to facilitate autonomous cross-scope rollovers without service interruption.

In some embodiments, a secrets management service, such as dSMS, can deliver secrets (e.g., to a node, service application, fabric controller, etc.) using a secure blob, which is an encrypted structured binary sequence of data. Generally, dSMS can support autonomous rollover of secrets in a distributed computing environment co-hosting various service applications. dSMS can generate a secrets package including a secure blob which contains secrets managed by dSMS for a particular service. The secrets package optionally includes certificates outside of the secure blob. The secrets package can be pushed to a container during the deployment of a corresponding service application. When a rollover occurs for a secret in a secure blob, dSMS generates a new secure blob containing the renewed secret. The next poll from an agent on the container will deliver the new secure blob to the container. As such, a secure blob can be used to deliver periodically refreshed secrets as they change.

In some embodiments, autonomous secrets rollover includes secret staging. Depending on the nature of a secret, applications which make use of the secret may require an orchestrated rollover across a service. Such orchestration can be achieved by a staging mechanism implemented on a client, a service, or both. In a client-side staging model, a secrets management service, such as dSMS, pushes renewed secrets to a container, and the secrets are securely cached in a staged mode. A corresponding application and/or an external orchestration engine can determine when to begin using the secret, and can trigger the unstaging of the secret for active use. In a service side-staging model, a secrets management service, such as dSMS, can rotate secrets according to a defined rollover policy, but defer pushing renewed secrets to all nodes of a tenant (or application) at once. Instead, dSMS pushes secrets to one update domain at a time and waits for feedback from application services deployed in the update domain prior to moving to the next update domain. In this manner, staging allows a phased rollover of new secrets by validating usage of new secrets prior to a full rollover across all services.

As such, autonomous secrets rollover can be achieved by autonomous orchestration of secrets renewal and distribution. A secrets management service, such as dSMS, can achieve autonomous secrets rollover in a distributed computing environment. In various embodiments, dSMS can autonomously rollover client certificates for authentication of users who access a security critical service, autonomously rollover storage account keys, track the delivery of updated secrets to secrets recipients, autonomously rollover secrets for services sharing secrets with other services across regional or other scope boundaries, deliver secrets to a service application using a secure blob, and/or facilitate autonomous rollover using secrets staging.

In this manner, techniques disclosed herein improve upon conventional systems in various ways. For example, a secrets management service can facilitate a fully autonomous secrets rollover, rotating secrets through a distributed environment in a more efficient manner than conventional systems, and without requiring manual orchestration. For example, a service model and/or corresponding configuration file does not need to be updated, and autonomous secrets rollover can occur without redeploying the services which use the secrets, thereby avoiding outages and security non-compliances resulting from conventional practices. Various aspects described herein provide novel or otherwise improved functionality, including the ability to track rollover progress, provide autonomous cross-scope rollovers without service interruption, deliver secrets using a secure delivery mechanism, and provide a phased rollover of new secrets by validating usage of new secrets prior to a full rollover across all services. As such, using techniques described herein, rollover and expiration of secrets are more predictable than conventional systems, and unlike conventional systems, rollover can be performed without service disruption within a distributed computing environment.

Datacenter Secrets Management Service (dSMS)

With reference to FIG. 1, embodiments of the present disclosure can be implemented in a distributed computing environment (e.g., example distributed computing environment 1400 in FIG. 14) which facilitates autonomous secrets renewal and/or distribution. In the embodiment illustrated in FIG. 1, autonomous secrets management system 100 includes front end 105, data center secrets management service ("dSMS") 110, certificate authority ("CA") 115, fabric controller 120, and node 130 with virtual machine ("VM") 145. Node 130 includes host agent 135 and credentials management host agent plug-in 140, and VM 145 includes guest agent 150 and credentials management service 155. Some of the components of autonomous secrets management system 100 can correspond to components in example distributed computing environment 1400 in FIG. 14. Likewise, autonomous secrets management system 100, or aspects thereof, may be implemented using one or more computing devices such as computing device 1500 of FIG. 15. The components of autonomous secrets management system 100 may communicate with each other via a network, which may include, without limitation, one or more local area networks (LANs) and/or wide area networks (WANs). Such networking environments are commonplace in offices, enterprise-wide computer networks, intranets, and the Internet.

Generally, a client may configure a service model via front end 105 to deploy a desired service. Front end 105 operates as a service end point for the distributed computing environment. Previously, the client could define secrets to be used by the service, and the service model (e.g., a configuration file of the model) was generated that referenced a particular version of a secret (e.g., a certificate thumbprint). Once a service instance was deployed (e.g., the service model was distributed), the service was pinned to the particular version of the secret manually specified in the service model. If the secret expired or got revoked, the client had to manually renew the secret, provide the renewed secret, update the configuration model, and redeploy each service that relied on the secret (issuing new deployments to push them all down). Such conventional techniques required significant human intervention, which can be time consuming, inefficient, and susceptible to human error.

As such, techniques disclosed herein can implement autonomous secrets rollover such that a client need only initially configure a desired service and specify a secrets rollover policy, after which a secrets management service can autonomously rollover the secrets. Additionally and/or alternatively, techniques disclosed herein can utilize an alternative structure in which a service (e.g., a service model and/or corresponding configuration file) references a location for a secret (e.g., a path) instead of a particular version (e.g., thumbprint). As used herein, this is referred to as pinning the service to location or path. When a secret is renewed, the location or path does not change. As such, the service model and/or corresponding configuration file does not need to be updated, and autonomous secrets rollover can occur without redeploying the services which use the secrets.

In the embodiment illustrated in FIG. 1, a client can configure a particular distributed computing service via front end 105. The configuration can include specifying secrets and a secrets rollover policy (e.g., timing for renewals, dependent services, timing for distribution of renewed secrets, staging, cross-scope applicability, etc.). A service model and/or configuration file can be generated referencing secrets by the path (e.g., absolute, relative, etc.) at which they are stored. For example, dSMS 110 can store secrets in secrets store ("SS") 113, so the referenced secrets path can be the directory of secrets store 113. Advantageously, dSMS 110 is implemented using Representation State Transfer ("REST") communications protocol to facilitate inferring the directory of the secrets store from the system architecture. For example, in embodiments with one dSMS per region (e.g., US West), the US West secrets store can be assigned as the secrets store for tenants with a home location in US West. By implementing REST, the absolute path of a secret need not be specified in a service model and/or configuration file because it can be inferred based on the tenant's home location. As such, implementing REST can simplify system communications. Other variations and combinations of representations of the path are contemplated with embodiments described herein.

Generally, dSMS 110 is a secrets management service which can be deployed in a distributed computing environment and that generally orchestrates the autonomous secrets rollover. As used herein, secrets rollover comprises secrets renewal and distribution. Generally, a secret may be initially provided to dSMS 110, which installs and initially deploys the secret. As used herein, installing a secret refers to storing or otherwise making the secret accessible to support authentication operations. For example, dSMS 110 may store secrets in secrets store 113, including certificates (e.g., chained, self-signed, imported, etc.), storage account keys, shared access signatures ("SAS"), connection strings, custom types, and/or the like. Generally, secrets are associated with a service resource (e.g., a particular storage blob, service principal object, connection string, etc.). Additionally and/or alternatively, secrets can be associated with a deployment identification (e.g., <Fabric DNS, Tenant Name> tuple). In some embodiments, dSMS 110 pushes secrets to fabric controller 120 which caches them in secrets store 123. A push model can be beneficial to the extent it removes dSMS 110 from critical workflows in fabric. During an initial deployment, fabric controller 120 can deploy the specified secrets to corresponding VMs and/or nodes (e.g., to start an instance). When a secret managed by dSMS 110 is up for renewal (e.g., based on the specified renewal policy, based on a requested on-demand rollover, etc.), dSMS 110 can automatically renew the secret (e.g., by issuing a new version of the secret, such as a self-signed certificate, by requesting a new version of the secret from an external authority, such as certificate authority 115, by requesting or otherwise accessing a new version of a secret, etc.). New versions of secrets such as SSL/TLS certificates can be automatically linked to prior versions (e.g., using Schannel linking) to avoid the need to re-bind and/or reboot. Renewed secrets are stored at the designated path for each secret, pushed to fabric controller 120 for caching in secrets store 123, and fetched by corresponding VMs and/or nodes. In this manner, dSMS 110 facilitates a fully autonomous secrets rollover.

In some embodiments, dSMS 110 can generate service objects to encapsulate information about secrets, secrets versions, and secrets deployments. Service objects define the services which use dSMS. Service objects generally include a list of secrets which will be used by a deployed service and a list of deployment information. Deployment information can specify where the secrets are deployed (e.g., cluster, tenant), the identity certificate for a corresponding service agent, an internal state of fabric controller 120 for tracking which versions of secrets have been installed there, and/or whether secrets installed on an agent are up to date. dSMS 110 can generate, update and otherwise manage corresponding service objects during various stages of operation, including onboarding, deployment, secret rollover, and/or reconciliation with the fabric. For example, during onboarding, a client registers with dSMS 110 by specifying secrets and a secrets rollover policy for a particular service, and dSMS 110 creates a corresponding service object for the service. During deployment, dSMS 110 contacts fabric controller 120 and pushes the secrets referenced in a corresponding service object to secrets store 123. During a secret rollover, dSMS 110 can refer to a service object to lookup and/or update the internal state of fabric controller 120 to reflect whether the renewed secret has been pushed to fabric and/or confirmed. In some embodiments, fabric controller 120 can poll dSMS 110 for updates and provide an indication of its internal state. If dSMS 110 recognizes an internal state that is different from the state recorded in a corresponding service object, dSMS 110 can respond with updates.

In some embodiments, dSMS 110 can provide a data feed providing access to metadata about secrets. For example, a compliance auditor may use the data feed to verify secrets are in compliance. Additionally and/or alternatively, the data feed can be leveraged as a part of an external auto-renewal process. For example, an external agent can interrogate dSMS 110 via the data feed to monitor for an approaching expiration, which can trigger a workflow to renew and push a secret to dSMS 110. This configuration is merely one example, and other variations will be understood by those of ordinary skill in the art.

Returning now to autonomous secrets management system 100, the components of autonomous secrets management system 100 may be configured to facilitate any or all of the techniques described herein. For example, some or all of the components can be configured to reference secrets using their path at which they are stored. As another example, secrets store 123 of fabric controller 120 can serve as a cache for secrets managed by dSMS 110. Generally, dSMS 110 can push secrets to the fabric during an initial deployment. Subsequently, any time a secret is renewed, dSMS 110 can update the secret in secrets store 123 of fabric controller 120. This way, secrets store 123 of fabric controller 120 can be used as a reference for version control, removing dSMS from service healing processes. For example, if VM 145 goes bad during a rollover, but before the VM's cached secrets have been updated, host agent 135 can interrogate secrets store 123 as part of the self-healing process, instead of issuing a request to dSMS 110, to ensure regeneration occurs using the latest secrets cached in secrets store 123.

On the node side, when an agent of node 130 (e.g., host agent 135, guest agent 150, etc.) receives managed secrets, it can install the secrets on a corresponding secrets store (optionally subject to staging, as discussed in more detail below). A credentials management component (e.g., credentials management host agent plug-in 140, credentials management service 155, etc.) can coordinate updates on node 130. For example, the credentials management component can periodically poll dSMS 110 using a defined polling interval (e.g., once a day) for updates. The poll can include metadata identifying the deployment and/or the current version of the secrets on node 130. In the event renewed secrets are available, dSMS 110 replies with the renewed secrets, and the credentials management component installs them.

Figure 2:
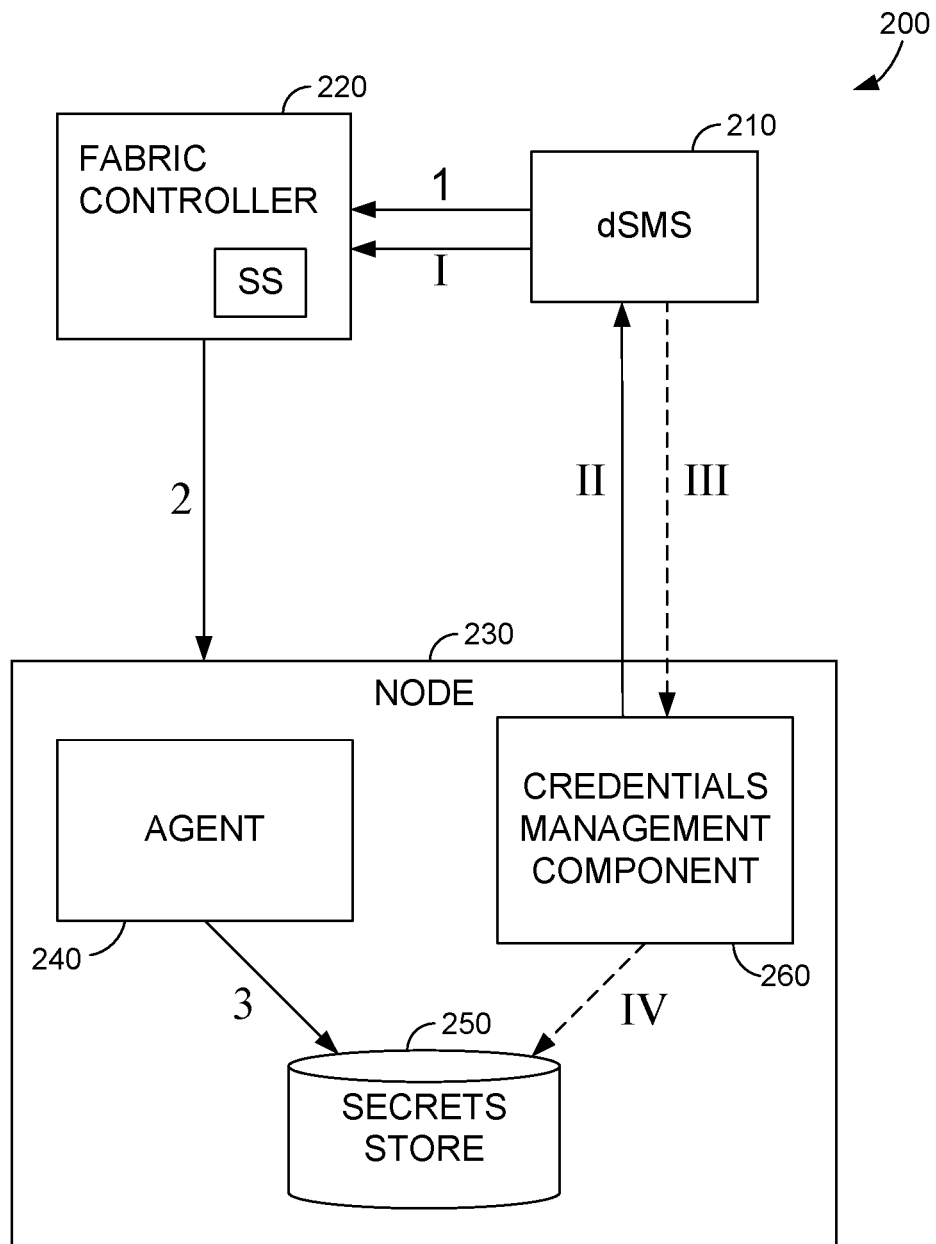
FIG. 2 is a block diagram of an autonomous secrets management system, in accordance with embodiments described herein.

Turning now to FIG. 2, FIG. 2 illustrates example process flows through example autonomous secrets management system 200. In this embodiment, autonomous secrets management system 200 includes dSMS 210, fabric controller 220, and node 230. Node 230 includes agent 240, secrets store 250, and credentials management component 260. An example service deployment is indicated in FIG. 2 by Arabic numerals 1, 2, and 3. An example secret renewal is indicated in FIG. 2 by Roman numerals I, II, and III. For example, during an initial deployment of a particular service, dSMS 230 pushes the secrets for the service to fabric controller 220, which starts a corresponding role for the service and provides a secrets package to agent 240. Agent 240 installs the secrets in secrets store 250 for use by the service. During a secrets renewal, dSMS 210 generates, requests, or otherwise accesses a renewed secret and pushes the renewed secret to fabric controller 220. Meanwhile, credentials management component 260 periodically polls dSMS 210 for renewed secrets. When a renewed secret is available, dSMS 210 provides the secret to credentials management component 260, which installs the secret in secrets store 250.

As such, an autonomous secrets management system can be provided which automates secrets lifecycle management, including autonomous renewal and/or distribution of secrets. By configuring a service to reference the location of a particular secret, autonomous renewal can occur without redeploying the service. As such, an autonomous secrets management system can be provided that performs autonomous rollover of secrets without manual redeployments and/or service interruptions.

Automatic Updates of Client Certificates

Figure 3:
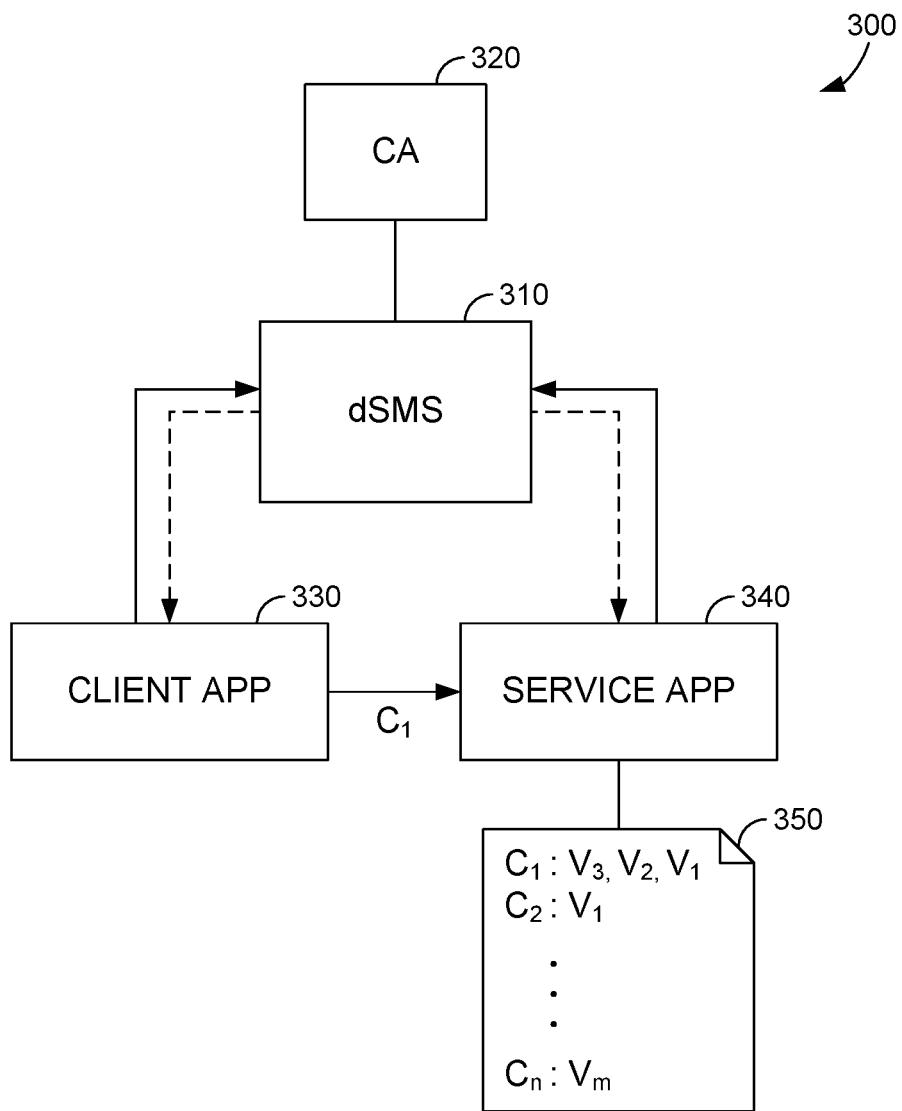
FIG. 3 is a block diagram of an autonomous client certificate management system, in accordance with embodiments described herein.

Generally, a client calling into a service (e.g., on a server and/or in a distributed computing environment) can authenticate in various ways, including using certificates. When a certificate gets updated (e.g., version 1 to version 2), the new version will have a different thumbprint. If the certificate is updated for only one of the client and service, authentication will fail. As such, in some embodiments, a secrets management service (e.g., dSMS 110, 210, 310, 410, 435, 445, 455, 510, etc.) can be utilized to autonomously rollover client certificates for authentication of users who access a security critical service. FIG. 3 illustrates example autonomous client certificate management system 300, in accordance with embodiments described herein. Autonomous client certificate management system 300 includes dSMS 310, certificate authority 320, client app 330, service app 340, and whitelist 350. Generally, dSMS 310 can correspond to dSMS 110 and/or dSMS 210 of FIGS. 1 and 2, respectively.

Generally, client app 330 is onboarded into dSMS 310, so required certificates (e.g., the client certificate "CER") can be initially deployed into client app 310. Client app 330 and/or service app 340 can fetch renewed certificates using the polling technique described above. Service app 340 can be deployed using any mechanism, and generally whitelists client certificates in whitelist 350. To accomplish this, service app 340 is provided with the CER and its corresponding location in dSMS 310. When client app 330 connects to service app 340 (e.g., in a TLS session), client app 330 presents the latest copy of the CER to service app 340. Service app 340 checks whitelist 350, and if the CER is in the whitelist, validation succeeds. Otherwise client certificate validation fails, and an incident alert may be issued.

Various fallback techniques can be applied in the event client certificate validation fails. For example, in some embodiments, dSMS 310 generates and distributes multiple versions of secrets, such as client certificates (e.g., in a vector). By way of non-limiting example, dSMS 310 can package and distribute three versions of certificates. Additionally and/or alternatively, secrets recipients can maintain a cache of prior versions instead of deleting them. As such, in the event client certificate validation fails, client app 330 can retry with a prior version of the CER. In another example, if validation fails, service app 340 can poll dSMS 310 for any updates to the secrets stored in whitelist 350 (e.g., an updated CER).

Advantageously, service app 350 can include a worker thread which periodically polls dSMS 310 for updated public information. Since the request is for public information, the request can be an anonymous call to a public end point of dSMS 310. The worker thread can be packaged as a shared library (e.g., MICROSOFT's dynamic link library ("DLL")) for service app 340 to consume. By packing the polling logic into a DLL, dSMS 310 can control a back-off strategy for polling requests and/or updates to the polling API. Additionally and/or alternatively, when dSMS 310 renews a secret (e.g., the CER), dSMS 310 can distribute the renewed secret to client 330 via a trusted end point of dSMS 310 subject to a secrets release delay. A secrets release delay waits for a configurable time period releasing and/or delivering the renewed private key to client app 330, while advertising the renewed public key to service app 340. In this manner, a secrets release delay can provide service app 340 with time to poll dSMS 310 to pick up the renewed CER before dSMS 310 releases the renewed CER to client app 330.

In this manner, dSMS can be utilized to autonomously rollover client certificates for authentication of users who access a security critical service.

Automatic Rollover of Storage Account Keys

In some embodiments, a secrets management service (e.g., dSMS 110, 210, 310, 410, 435, 445, 455, 510, etc.) can be utilized to autonomously rollover storage account keys. Generally, storage account keys utilize primary and secondary keys. A given key has a designated lifecycle, and the continued use of a key after its designated lifecycle would be noncompliant. Rolling over storage account keys and/or SASes involves considerations involving these primary and secondary keys.

For example, in some embodiments, primary and secondary keys for a storage account are rolled over on a predefined schedule in an interleaving fashion. More specifically, the expiration of the primary key is arranged to be separate from the expiration of the secondary key. A customer can specify the renewal period in dSMS, for example, when onboarding into the dSMS. In an example in which keys have a two year expiration, every year either the primary or the secondary key is renewed and distributed. In some embodiments, timer workers can be used to autonomously renew storage account keys.

Any SASes which depend upon a storage account key can be generated and/or rolled over based on the expirations of the storage account keys. For example, dSMS can define an active key as the key which has farther expiration (i.e. the key which is valid for the longer period of time). As such, dSMS can generate any SASes using the active key. Moreover, any SASes which depend upon a storage account key can be rolled over prior to rolling over the key upon which they depend. For example, if a first storage account key is being rolled over, dSMS can regenerate any dependent SASes using the other key prior to rolling over the first key. In some embodiments, timer workers can be used to autonomously renew storage account keys and/or autonomously regenerate SASes.

In this manner, a secrets management service such as dSMS can be utilized to autonomously rollover storage account keys. As such, rollover and expiration are predictable, and rollover can be performed without breaking a communication scheme.

Secrets State Tracking

Generally, secrets can be associated with deployments (e.g., deployment location). Sometimes, a particular service object can be associated with multiple deployment locations (e.g., for redundancy). As such, sometimes a particular secret can be associated with multiple deployment locations. In some embodiments, a secrets management service (e.g., dSMS 110, 210, 310, 410, 435, 445, 455, 510, etc.) can track the delivery of updated secrets to each associated deployment location. For each secret, dSMS can track its status across all nodes and/or agents in the fleet for a particular location or service object. For example, dSMS can track the internal state of each of each node and/or agent in fabric and update it whenever the node/agent polls. This way, dSMS can track the entire rollover progress of secrets and fire off desired alerts.

In some embodiments, dSMS can create and maintain a state tracker for secrets recipients. For example, an agent state tracker can be a repository for the state of agents at each of the deployment locations. Various states can be tracked (e.g., secret not delivered, secret delivered, secret confirmed) for each instance, and the states can be encoded for storage (e.g., 0, 1, 2). In some embodiments, the last time an agent polled dSMS can be tracked. Generally, polling can include metadata identifying the deployment and/or secrets metadata identifying the current version of the secrets used by the instance and/or their path. As such, if an agent and/or an associated polling component (e.g., credentials management host agent plug-in 140, credentials management service 155, credentials management component 260, a polling component of client app 330 and/or service app 340, a polling component of US West 430, US East 440 and/or Japan 450, credentials management service 530, etc.) polls with an incorrect state (e.g., dSMS delivered a renewed secret and expected a confirmation, but the agent polled with the prior secrets version), dSMS can resubmit the renewed secret to the agent. Since polling occurs periodically, in some embodiments, the state tracker for secrets recipients need not be backed up, since it can be reconstituted from polling requests that indicate an agent's internal state.

In some embodiments, dSMS can create and maintain a state tracker to track the progress of a particular rollover. This state tracker can also be thought of as a dSMS state tracker. Advantageously, a separate repository is created for maintaining the agent states than for maintaining the dSMS state to prevent locking the dSMS repository at a higher rate, hence making it more available for other management operations. For each secret, dSMS can track the secret's expiration, last poll, next poll, and rollover state (e.g., rollover started, rollover completed), which can be encoded for storage (e.g., 0, 1). In one example, dSMS can create a goal state corresponding to a successful rollover (e.g., rollover completed) and/or dSMS can set the current dSMS state to "rollover started" after a successful push to the fabric and/or once dSMS releases the secret to the polling agents. Once delivery of a renewed secret to each agent for a particular service has been confirmed (e.g., the agent state tracker indicates a corresponding confirmed state for each agent), dSMS can move the current dSMS state to the goal state (e.g., "rollover completed"). More specifically, a worker thread can monitor the agent state tracker to identify when all the role instances have a secrets confirmed state. The worker thread can then update the dSMS state to indicate the rollover is complete, and can delete the corresponding records from the agent state tracker.

In this manner, dSMS can track rollover progress and fire off desired alerts. More specifically, the use of one or more state trackers can be used to drive alerts and/or triggers. For example, dSMS can generate a warning that a rollover previously began but has not completed within some predetermined amount of time (e.g., within 2 months of beginning the rollover, before 30 days prior to expiration, etc.). Similarly, dSMS can provide a notification to a customer when a rollover starts in order to trigger a customer workflow (e.g., a manual update, a secrets release delay, etc.). Additionally and/or alternatively, a data feed of dSMS can be interrogated to permit a process to monitor or otherwise check one or more of the state trackers, for example, to provide a warning, trigger a workflow, and the like.

Cross-Scope Secrets Management

There are several scenarios in which it may be desirable for services to share secrets. For example, when redundancy is desired across regions, in case one region (or its dSMS) goes down, the secrets can be backed up in redundant region. As such, in scenarios operating independent data centers in multiple regions, each data center can include its own dSMS. In this case, the redundant services and/or dSMSes should share secrets. In another example of sharing secrets, some clients may need to connect services across regions, so authenticating such services can involve shared secrets.

When services that need to share secrets are not in the same replication scope, various problems can arise in conventional systems. As explained above, when distributed secrets are renewed, there is no conventional mechanism to automatically rollover updates. This can cause issues, for example, when a manual rollover is not completed before a secret expires (e.g., system outage, non-compliance, etc.). In another example, some cross-scope architectures require rotating storage account keys. However, when storage account keys are rotated, the old key becomes invalid. Without a mechanism to automatically rollover updates, rotating a storage account key in one replication scope can break a cross-scope communication scheme. As such, there is a need for a broker to orchestrate the sharing of secrets across scopes to ensure.

Accordingly, in some embodiments, a cross-scope secrets management service, such as dSMS, can be utilized to orchestrate cross-scope secrets rollover. A dSMS may be provided in each scope (e.g., each region) utilized by a service. To orchestrate secrets renewal and distribute across scope boundaries, a cross-scope dSMS can be deployed in an arbitrary scope. During an initial deployment, a customer onboards secrets with a cross-scope dSMS, registering cross-scope secrets and their desired availability across scopes (e.g., replication scope). The cross-scope dSMS can store the secrets, and the secrets can be referenced by their path in the cross-scope dSMS. Similarly, the customer onboards the secrets with each local dSMS by registering the cross-scope secrets and providing their location (e.g., their path in the cross-scope dSMS). In this manner, each local dSMS subscribes to receive updates from the cross-scope dSMS. As secrets are renewed, they are automatically propagated to the subscribing local dSMS and distributed within the local scope by the local dSMS (e.g., using the polling technique described above).

Generally, the cross-scope dSMS can orchestrate a cross-scope rollover (e.g., a global rollover). A cross-scope rollover can occur autonomously according to a defined secrets rollover policy and/or in response to a manual rollover request. For example, the cross-scope dSMS can automatically rollover secrets, as described above, and each local dSMS can periodically poll for updates. Additionally and/or alternatively, a rollover request can be received at the cross-scope dSMS and/or any local dSMS. In some embodiments, a rollover request received at a local (e.g., regional) dSMS can trigger an on-demand fetch request to obtain the most recent secret from the cross-scope dSMS. In the event a renewed secret is available, the local dSMSes can sync the newer version from the cross-scope dSMS, update its own copy, and distribute within its corresponding local scope.

Figure 4:
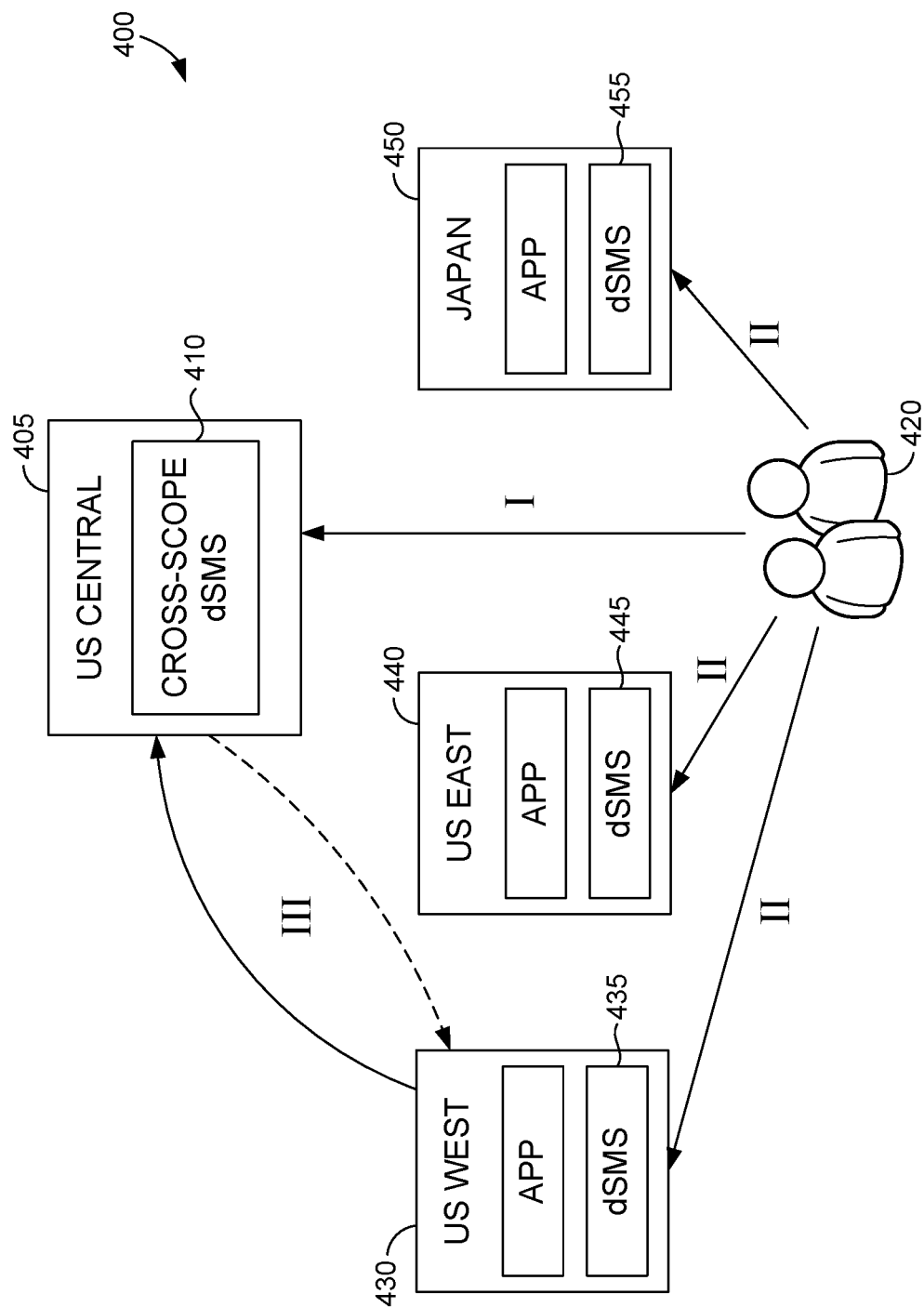
FIG. 4 is a block diagram of an autonomous cross-scope secrets management system, in accordance with embodiments described herein.

FIG. 4 depicts example autonomous cross-scope secrets management system 400. In this example, customer 420 onboards shared secrets with cross-scope dSMS 410 in US Central 405. Likewise, customer 420 onboards shared secrets with local dSMSes 435, 445, and 455 in US West 430, US East 440, and Japan 450, respectively. In some embodiments, customer 420 provides an initial copy of a shared secret to local dSMSes 435, 445, and 455 when onboarding. Additionally and/or alternatively, local dSMSes 435, 445, and 455 can fetch initial copies of shared secret from cross-scope dSMS 410 (e.g., during onboarding, periodic polling, etc.). When cross-scope dSMS renews a secret, local dSMSes 435, 445, and 455 pick up the renewed secret (e.g., during periodical polling) and distribute the renewed secrets within their corresponding local scopes.

In some scenarios, a local dSMS may not have the latest copy of a shared secret. Generally, state tracking can be performed across the composite cross-scope and local dSMSes to facilitate autonomous cross-scope rollovers without service interruption. For example, each local dSMS can track its own local rollover, while the cross-scope dSMS tracks a cross-scope rollover. Additionally and/or alternatively, the cross-scope dSMS can track local and cross-scope rollovers. If a cross-scope rollover has begun, but a local dSMS does not have the latest copy of a shared secret, the local dSMS may respond differently depending on the type of secret in question. For example, a local dSMS may continue using a prior version of a certificate/managed service identity until receiving a renewed version. However, for storage accounts, since a rolled over key in the cross-scope dSMS will invalidate a prior copy in a local dSMS, the local dSMS can fall back to an alternative key. For SASes, since a rolled over SAS token in the cross-scope dSMS will invalidate a prior copy in a local dSMS, a local application can trigger an on-demand fetch request for a renewed token from the cross-scope dSMS, which can trigger a corresponding local rollover. Other examples will be understood by those of ordinary skill in the art.

As such, services can share secrets across scope boundaries utilizing a cross-scope secrets management service such as dSMS to orchestrate cross-scope secrets rollover.

Delivery of Secrets as a Secure Blob

In some embodiments, a secrets management service (e.g., dSMS 110, 210, 310, 410, 435, 445, 455, 510, etc.) can deliver secrets to a service application using a secure blob. For example, dSMS can deliver secrets packaged in a secure blob to a service application co-hosted with other services in a distributed computing environment.

Generally, secrets required by a service can be grouped into a secrets package and delivered to various components in a secure manner. A secrets package includes a secure blob serving as a container for one or more of the service's secrets. The secrets package optionally includes one or more additional secrets such as a certificates outside of the blob. The secrets package and/or secure blob can be associated with the service and/or a corresponding role. Generally, a secure blob is an opaque byte array that may be extensible using a data serialization framework such as Bond. dSMS can package one or more managed secrets into a secure blob for distribution. For example, dSMS can package all secrets for a particular service, or some portion thereof, into a secure blob. Since the contents of the secure blob are generally invisible to components of a distribution pipeline, in some embodiments, one or more additional secrets for a service (e.g., certificates) can be included in the secrets package outside of the secure blob to facilitate use of those secrets by one or more components of the distribution pipeline and/or a distributed computing environment (e.g., binding a certificate to a particular endpoint). Advantageously, the secure blob is encrypted during transport (e.g., using the target machine's public key) and stored encrypted.

A secrets package may be used to distribute secrets, as described herein. For example, when a customer onboards secrets and associates them with a service object, dSMS may generate a secrets package and push the secrets package to fabric, and fabric can store the secrets and initially deploy them. Additionally and/or alternatively, dSMS may initially push certificates, after which it may generate and push a secure blob with the rest of the secrets for the service. In this scenario, fabric may initially deploy the secrets package and/or separately deploy the secure blob. For example, where a secrets package includes certificates that are not packaged in the secure blob, and the fabric deploys the secrets package to a node, an agent on the node can install the unpackaged certificates and save the secure blob to disk. As such, the secrets can be read by the service and/or a credential management component.

In some embodiments, the service object, the secrets package, and/or the secure blob can be version controlled (e.g., using entity tags ("ETag")). When a secret is renewed, a new secrets package and/or secure blob can be generated, the version on the secrets package, secure blob, and/or a corresponding service object can be updated, and the new secrets package and/or secure blob can be pushed to fabric. When an agent polls dSMS to check for renewed secrets, the agent can include secrets metadata indicting its current secrets version. dSMS can compare the version indicated by a polling request with the latest version (e.g., for the secrets package, secure blob, and/or a corresponding service object), and if the agent needs an update, dSMS can reply to the agent with the latest secrets package and/or secure blob.

As such, a secure blob can be used to deliver periodically refreshed secrets as they change.

Secret Staging

Depending on the nature of a secret, applications which make use of the secret may require an orchestrated rollover across a service. As such, in some embodiments, autonomous secrets rollover includes secret staging. Generally, services may be customized to stage and/or synchronize deployment of renewed secrets among their role instances. Such orchestration can be achieved by a staging mechanism implemented on a client, a service (e.g., dSMS), or both.

Figure 5:
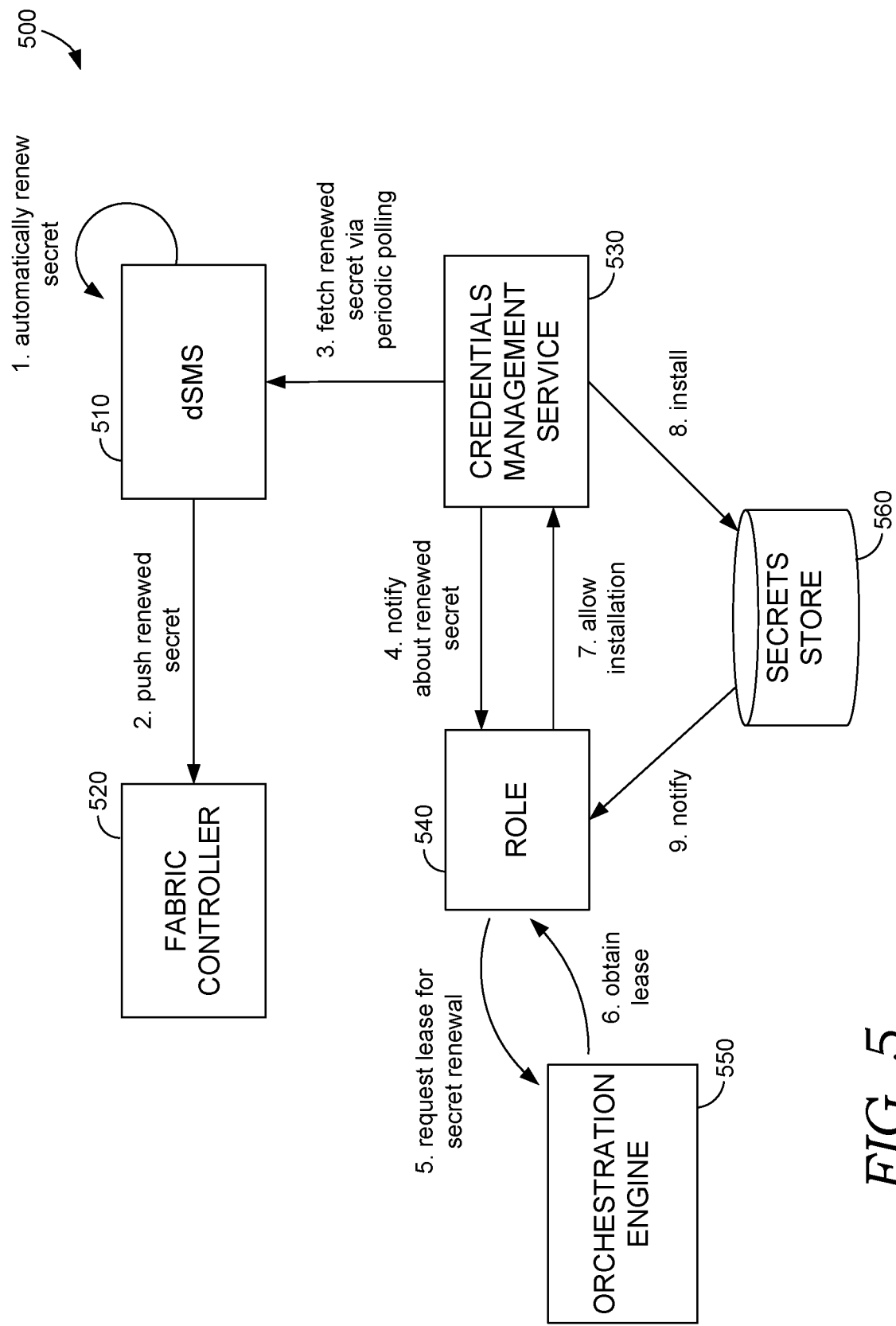
FIG. 5 is a block diagram of an autonomous secrets management system with staging, in accordance with embodiments described herein.

In a client-side staging model, a secrets management service (e.g., dSMS 110, 210, 310, 410, 435, 445, 455, 510, etc.) releases renewed secrets to a container, and the secrets are securely cached in a staged mode. A corresponding application and/or an external orchestration engine can determine when to begin using the secret, and can trigger the unstaging of the secret for active use. Client side staging may be specified by a customer (e.g., during onboarding), and may be applied selectively to designated secrets. FIG. 5 depicts an example autonomous secrets management system with staging.

In FIG. 5, autonomous secrets management system 500 includes dSMS 510, fabric controller 520, credentials management service 530, role 540, secrets store 560, and orchestration engine 550. In this embodiment, when dSMS 510 automatically renews a secret, it pushes the renewed secret to fabric controller 520 and releases the renewed secret to credentials management service 530. Credentials management service 530 picks up the renewed secret during the course of periodically polling dSMS 510. In this example, once credentials management service 530 receives a renewed secret, it caches the staged secret and waits for authorization to use the renewed secret. Generally, credentials management service 530 can cache the renewed secret by installing it at the same location as the prior secret with a property designating the secret's status as staged. In some embodiments, renewed certificates can be stored in the same location as the prior certificate without linking the renewed certificate to the prior version.

Various mechanisms can be utilized to evaluate and control when to unstage a cached secret. In one example, a local application can implement a desired staging routine. In another example in the embodiment depicted in FIG. 5, an external component is used to facilitate unstaging. More specifically, credentials management service 530 notifies role 540 that a renewed secret is available, and role 540 requests a lease to renew the secret from orchestration engine 550. Generally, orchestration engine 550 can determine when it is safe for a role to accept a renewed secret. For example, orchestration engine 550 may be in communication with multiple nodes and/or roles for a service in order to orchestrate a rollover within a service. For example, orchestration engine 550 may implement logic to update one node at a time (e.g., round robin, some other update scheduling, etc.). Generally, orchestration 550 can authorize role 540 to unstage a renewed secret (e.g., by granting it a lease to unstage the secret), upon which role 540 can accept the renewed secret by removing the staged property from the cached secret. For example, role 540 may call a method of credentials management service 530 that accepts the renewed secret in secrets store 560. In some embodiments, role 540 can be notified that the installation has occurred.

Additionally and/or alternatively, once orchestration 550 authorizes role 540 to unstage a renewed secret (e.g., by granting it a lease to unstage the secret), orchestration engine 550 may be capable of monitoring role 540 for some predetermined period of time (e.g., 24 hours) to determine a measure of the health of the role. For example, orchestration engine 550 may monitor health signals (e.g., CPU usage), authentication failures, and the like. In the event orchestration engine 550 determines that role is healthy and/or the renewed secret was unstaged successfully, orchestration engine 550 can apply the renewed secret to subsequent roles.

In a service side-staging model, a secrets management service such as dSMS can rotate secrets according to a defined rollover policy, but defer releasing renewed secrets to all nodes of a tenant (or application) at once. Instead, dSMS can release secrets to one update domain at a time and wait for feedback from application services deployed in the update domain prior to moving to the next update domain.

In this manner, staging allows a phased rollover of new secrets by validating usage of new secrets prior to a full rollover across all services.

Example Flow Diagrams

With reference to FIGS. 6-13, flow diagrams are provided illustrating methods for managing secrets in a distributed computing environment. The methods can be performed using the autonomous secrets management system described herein. In embodiments, one or more computer storage media having computer-executable instructions embodied thereon can, when executed by one or more processors, cause the one or more processors to perform the methods in the autonomous secrets management system.

Figure 6:
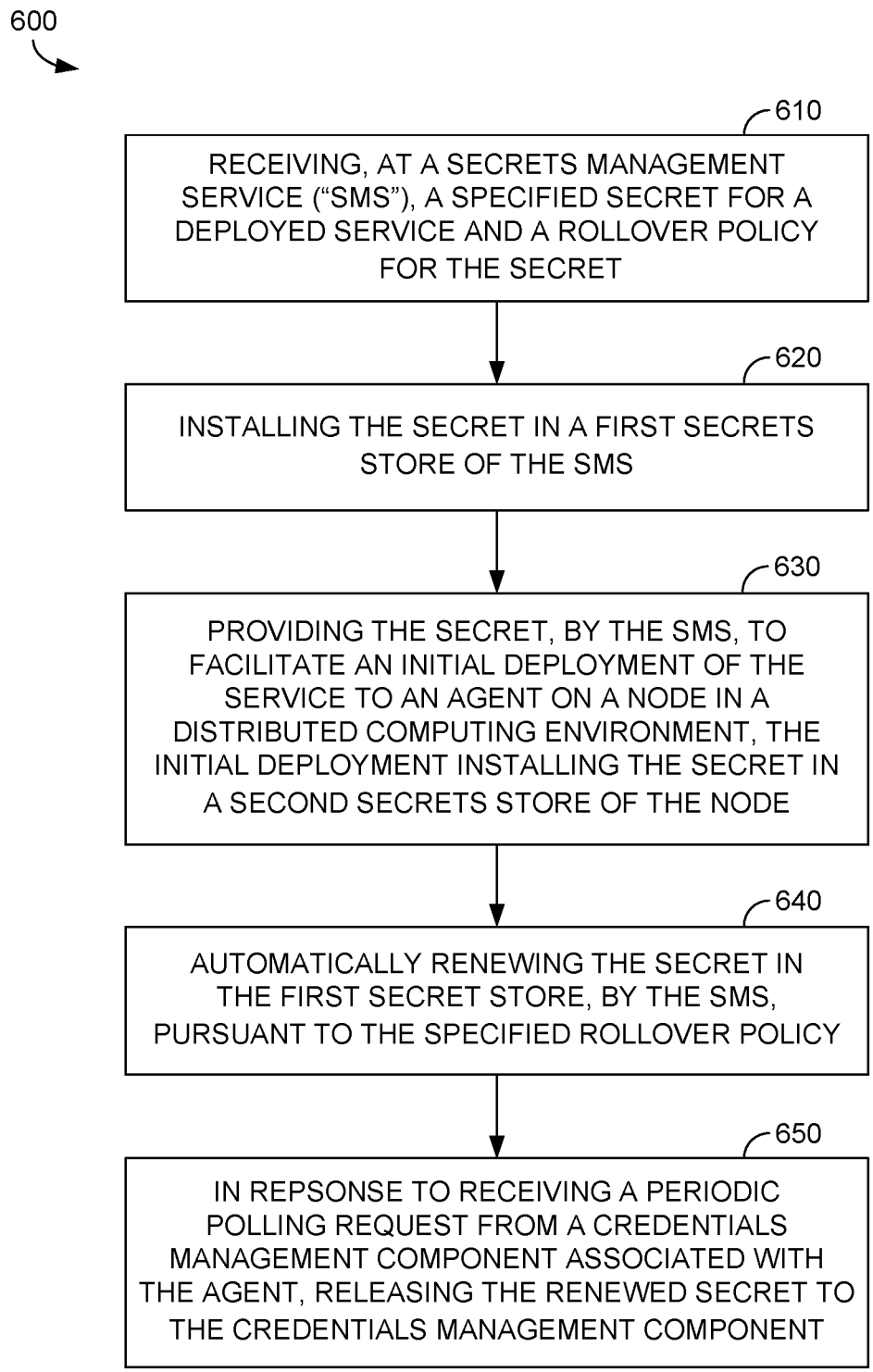
FIG. 6 is a flow diagram showing an example method for managing secrets, in accordance with embodiments described herein.

Turning now to FIG. 6, a flow diagram is provided that illustrates a method 600 for managing secrets in a distributed computing environment using a secrets management service. Initially at block 610, a specified secret for a deployed service and a rollover policy for the secret are received at a secrets management service ("SMS"). At block 620, the secret is installed in a first secrets store of the SMS. At block 630, the secret is provided by the SMS to facilitate an initial deployment of the service to an agent on a node in a distributed computing environment. The initial deployment comprises installing the secret in a second secrets store of the node. At block 640, the secret is automatically renewed in the first secret store by the SMS, pursuant to the specified rollover policy. At block 650, in response to receiving a periodic polling request from a credentials management component associated with the agent, the renewed secret is released to the credentials management component.

Figure 7:
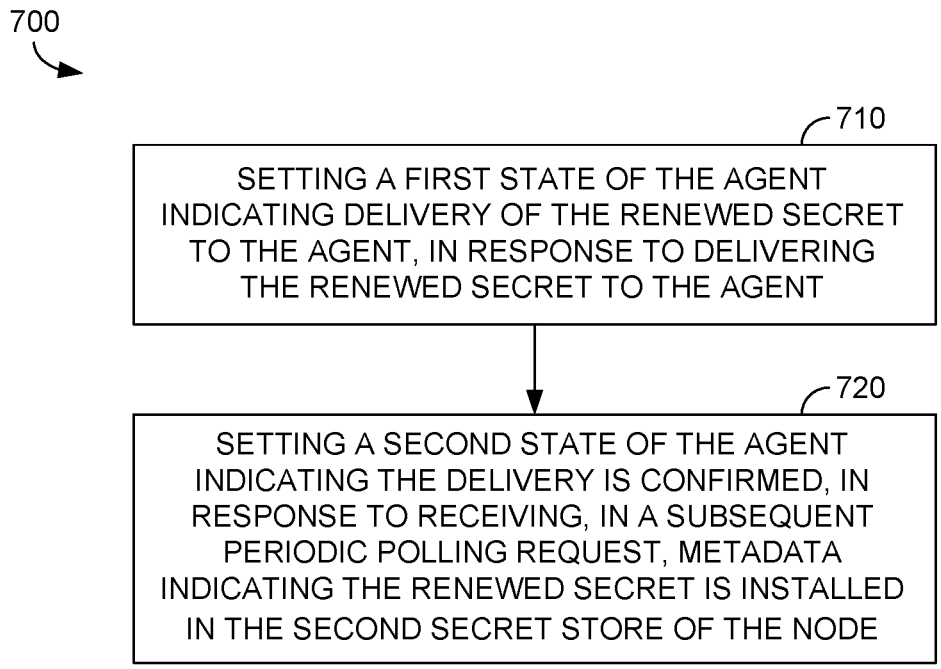
FIG. 7 is a flow diagram showing an example method for agent state tracking, in accordance with embodiments described herein.

Turning now to FIG. 7, a flow diagram is provided that illustrates a method 700 for agent state tracking. Initially at block 710, in response to delivering the renewed secret to the agent, a first state of an agent is set indicating delivery of the renewed secret to the agent. At block 720, in response to receiving, in a subsequent periodic polling request, metadata indicating the renewed secret is installed in the second secret store of the node, a second state of the agent is set indicating the delivery is confirmed.

Figure 8:
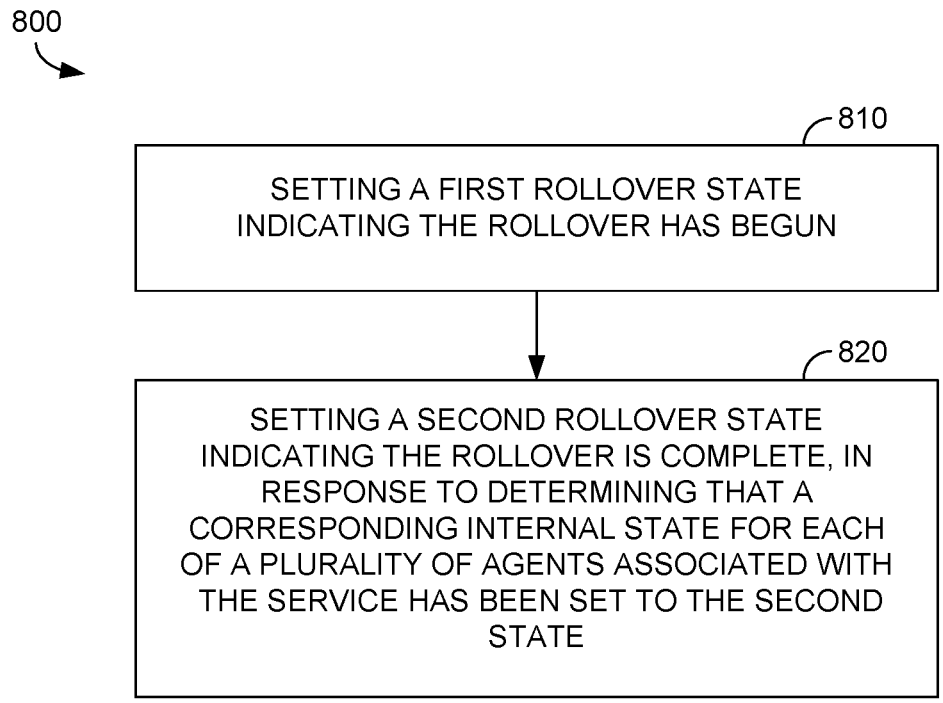
FIG. 8 is a flow diagram showing an example method for rollover tracking, in accordance with embodiments described herein.

Turning now to FIG. 8, a flow diagram is provided that illustrates a method 800 for rollover tracking. Initially at block 810 a first rollover state is set indicating the rollover has begun. At block 820, in response to determining that a corresponding internal state for each of a plurality of agents associated with the service has been set to the second state, a second rollover state is set indicating the rollover is complete.

Figure 9:
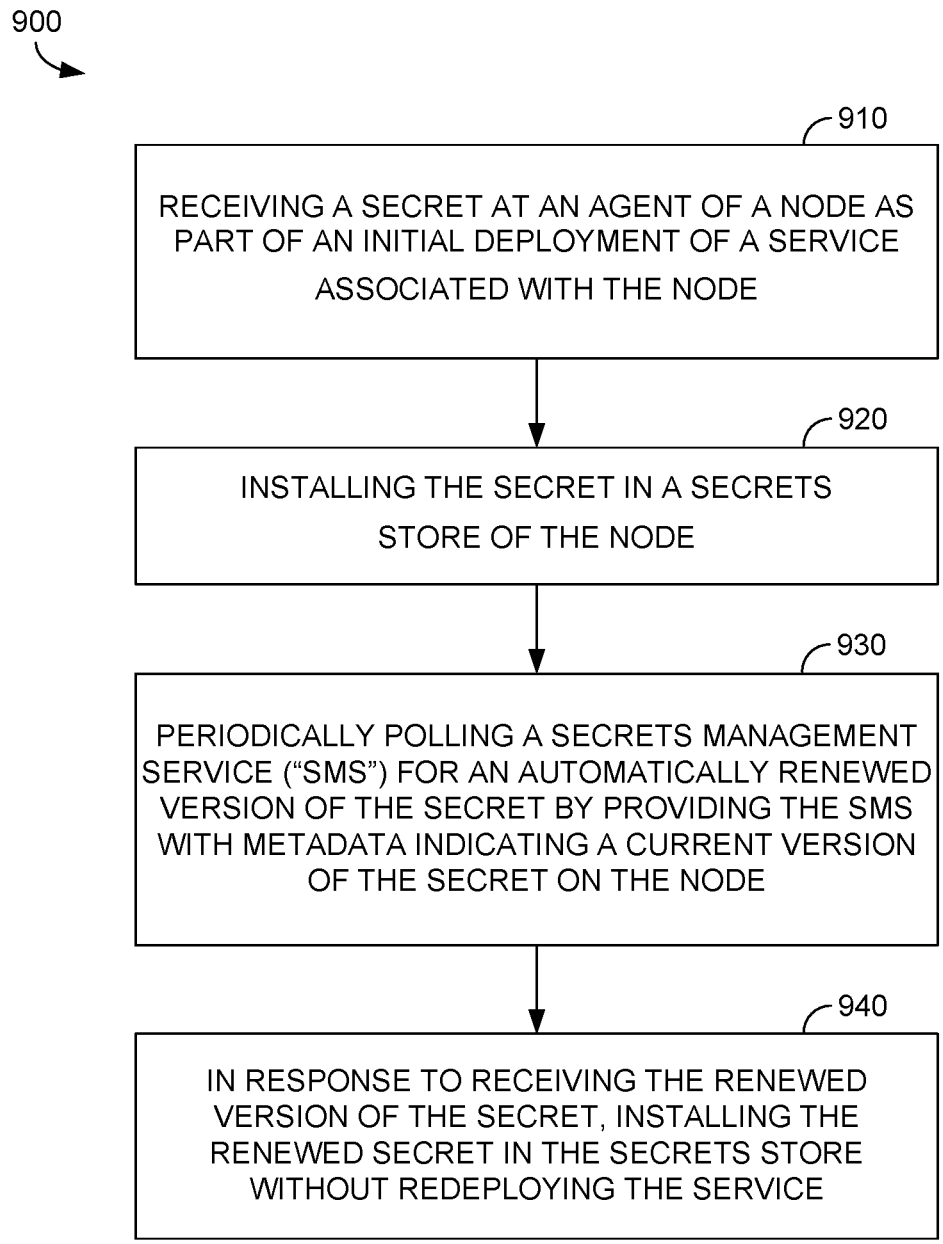
FIG. 9 is a flow diagram showing an example method for managing secrets, in accordance with embodiments described herein.

Turning now to FIG. 9, a flow diagram is provided that illustrates a method 900 for managing secrets using a secrets management service. Initially at block 910, a secret is received at an agent of a node as part of an initial deployment of a service associated with the node. At block 920, the secret is installed in a secrets store of the node. At block 930, a secrets management service ("SMS") is periodically polled for an automatically renewed version of the secret by providing the SMS with metadata indicating a current version of the secret on the node. At block 940, in response to receiving the renewed version of the secret, the renewed secret is installed in the secrets store without redeploying the service.

Figure 10:
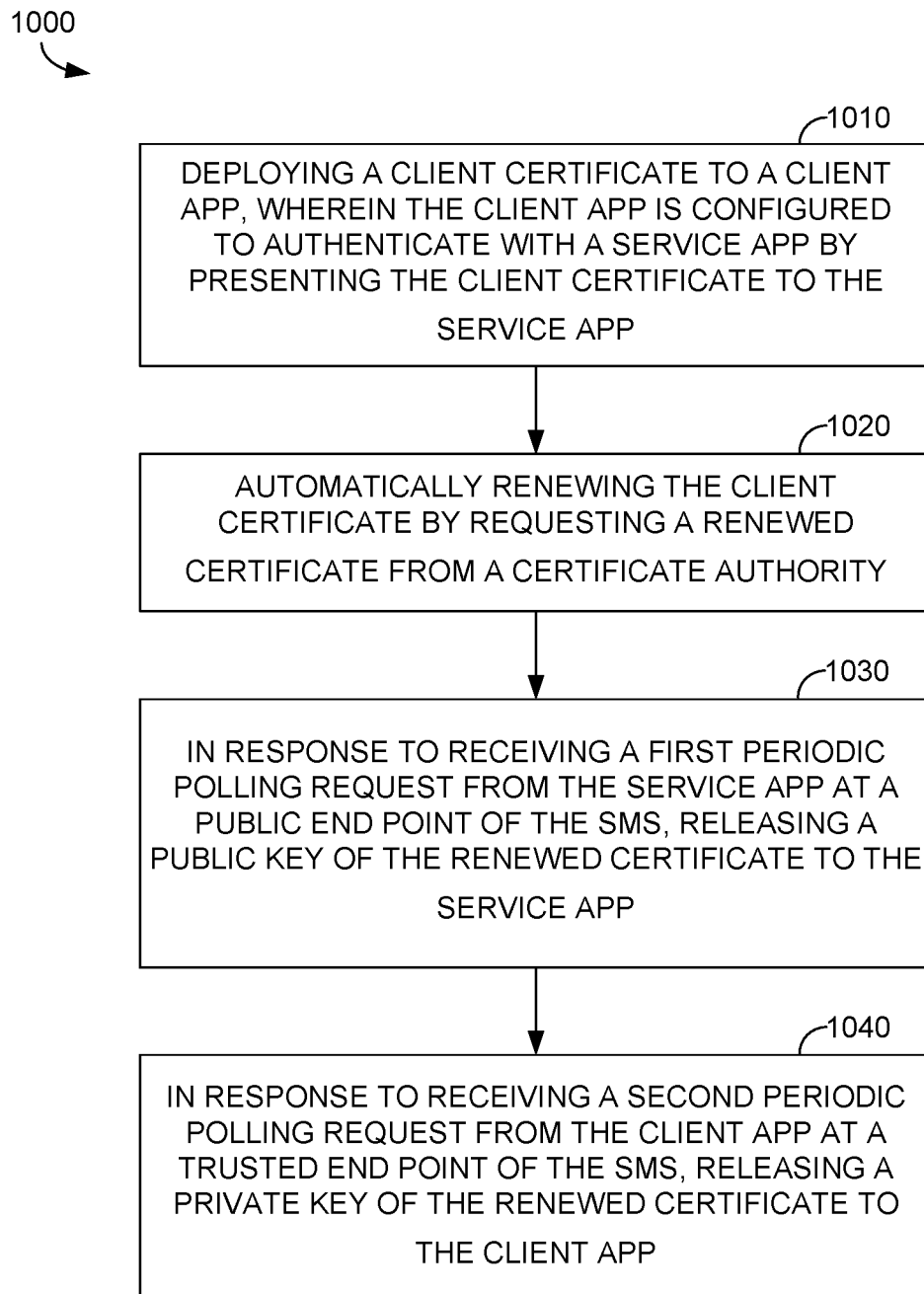
FIG. 10 is a flow diagram showing an example method for autonomous rollover of client certificates, in accordance with embodiments described herein.

Turning now to FIG. 10, a flow diagram is provided that illustrates a method 1000 for automatic rollover of client certificates. Initially at block 1010, a client certificate is deployed to a client app. The client app is configured to authenticate with a service app by presenting the client certificate to the service app. At block 1020, the client certificate is automatically renewed by requesting a renewed certificate from a certificate authority. At block 1030, in response to receiving a first periodic polling request from the service app at a public end point of the SMS, a public key of the renewed certificate is released to the service app. At block 1040, in response to receiving a second periodic polling request from the client app at a trusted end point of the SMS, a private key of the renewed certificate is released to the client app.

Figure 11:
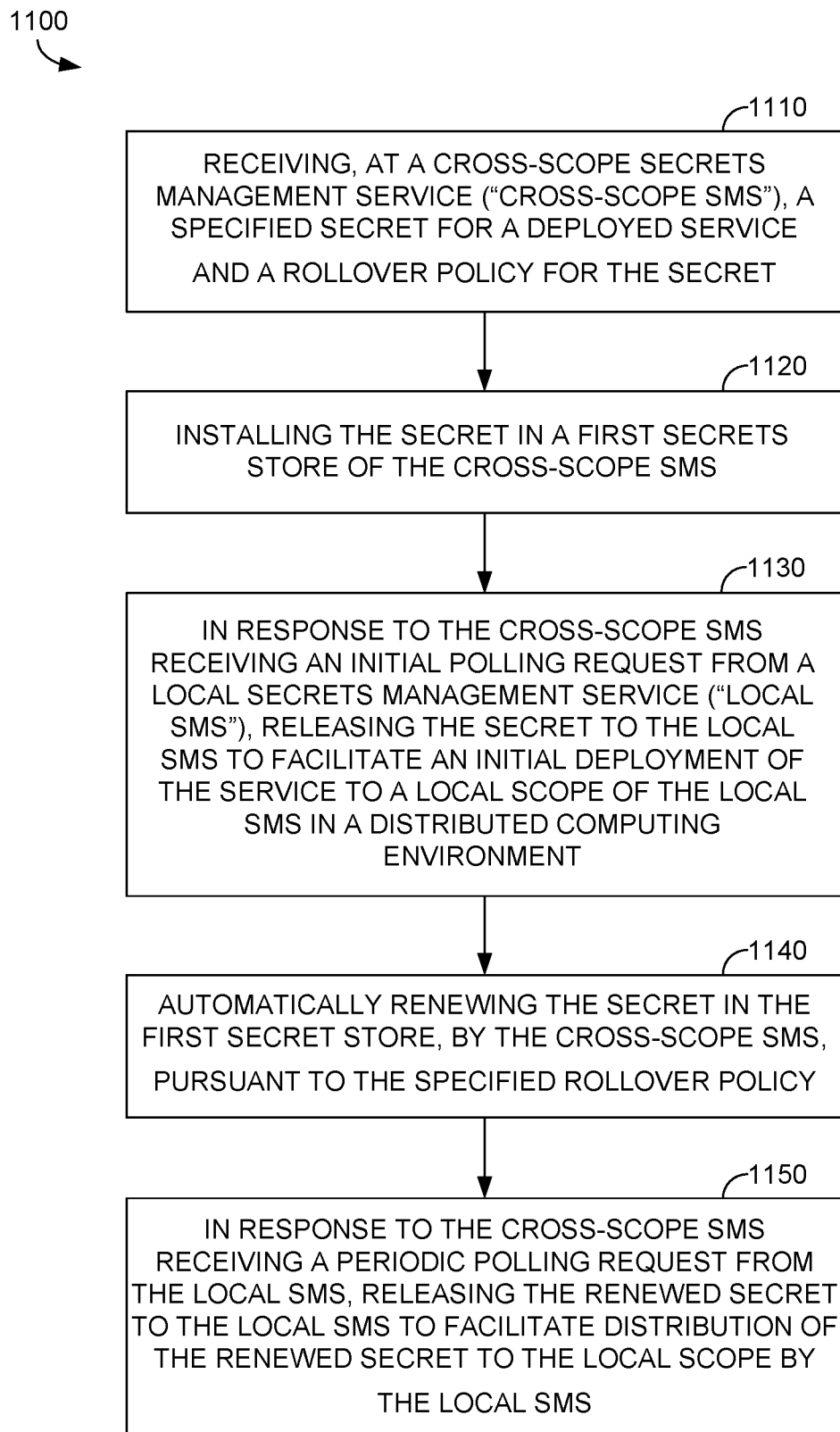
FIG. 11 is a flow diagram showing an example method for managing secrets across scope boundaries, in accordance with embodiments described herein.

Turning now to FIG. 11, a flow diagram is provided that illustrates a method 1100 for managing secrets across scope boundaries. Initially at block 1110, a specified secret for a deployed service and a rollover policy for the secret are received at a cross-scope secrets management service ("cross-scope SMS"). At block 1120, the secret is installed in a first secrets store of the cross-scope SMS. At block 1130, in response to the cross-scope SMS receiving an initial polling request from a local secrets management service ("local SMS"), the secret is released to the local SMS to facilitate an initial deployment of the service to a local scope of the local SMS in a distributed computing environment. At block 1140, the secret in the first secret store is automatically renewed by the cross-scope SMS, pursuant to the specified rollover policy. At block 1150, in response to the cross-scope SMS receiving a periodic polling request from the local SMS, the renewed secret is released to the local SMS to facilitate distribution of the renewed secret to the local scope by the local SMS.

Figure 12:
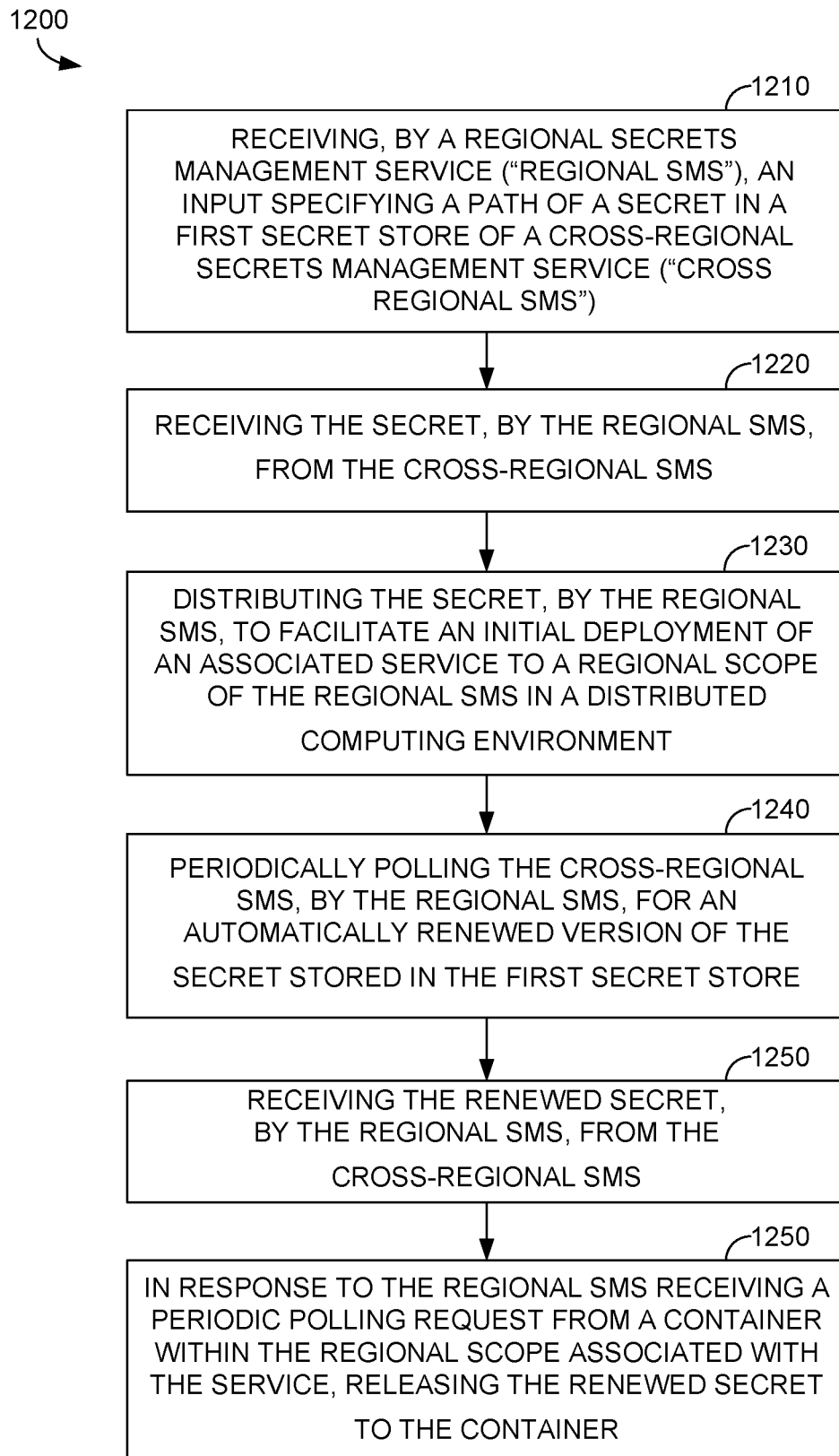
FIG. 12 is a flow diagram showing an example method for managing secrets across regional boundaries, in accordance with embodiments described herein.

Turning now to FIG. 12, a flow diagram is provided that illustrates a method 1200 for managing secrets across regional boundaries. Initially at block 1210, an input specifying a path of a secret in a first secret store of a cross-regional secrets management service ("cross-regional SMS") is received by a regional secrets management service ("regional SMS"). At block 1220, the secret is received by the regional SMS from the cross-regional SMS. At block 1230, the secret is distributed by the regional SMS to facilitate an initial deployment of an associated service to a regional scope of the regional SMS in a distributed computing environment. At block 1240, the cross-regional SMS is periodically polled by the regional SMS for an automatically renewed version of the secret stored in the first secret store. At block 1250, the renewed secret is received by the regional SMS from the cross-regional SMS. At block 1260, in response to the regional SMS receiving a periodic polling request from a container within the regional scope associated with the service, the renewed secret is released to the container.

Figure 13:
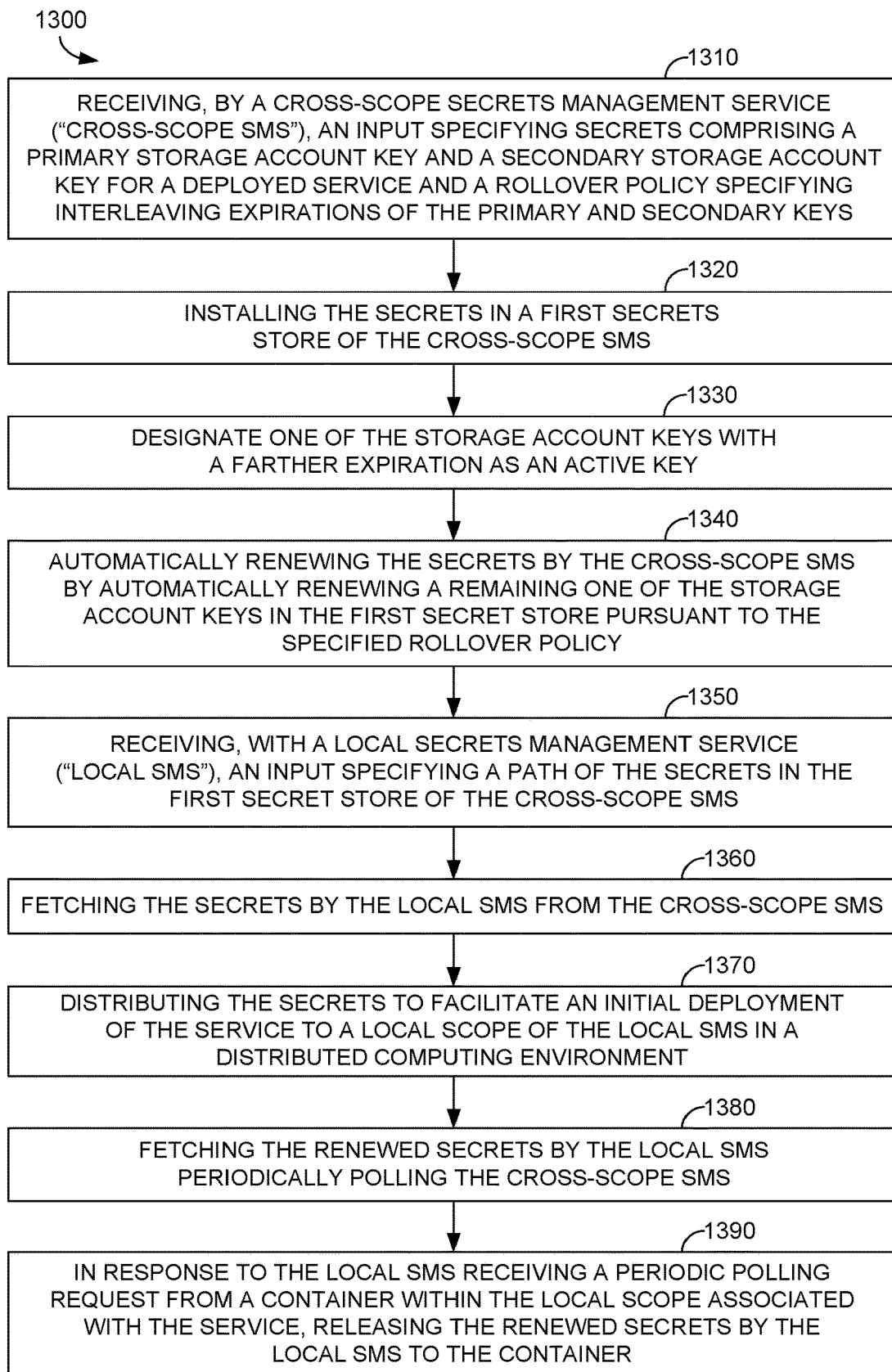
FIG. 13 is a flow diagram showing an example method for managing secrets across scope boundaries, in accordance with embodiments described herein.

Turning now to FIG. 13, a flow diagram is provided that illustrates a method 1300 for managing secrets across scope boundaries. Initially at block 1310, an input is received by a cross-scope secrets management service ("cross-scope SMS"). The input specifies secrets including a primary storage account key and a secondary storage account key for a deployed service. The input also includes a rollover policy specifying interleaving expirations of the primary and secondary keys. At block 1320, the secrets are installed in a first secrets store of the cross-scope SMS. At block 1330, one of the storage account keys with a farther expiration is designated as an active key. At block 1340, the secrets are automatically renewed by the cross-scope SMS by automatically renewing a remaining one of the storage account keys in the first secret store pursuant to the specified rollover policy.

At block 1350, an input specifying a path of the secrets in the first secret store of the cross-scope SMS is received by a local secrets management service ("local SMS"). At block 1360, the secrets are fetched by the local SMS from the cross-scope SMS. At block 1370, the secrets are distributed to facilitate an initial deployment of the service to a local scope of the local SMS in a distributed computing environment. At block 1380, the renewed secrets are fetched by the local SMS periodically polling the cross-scope SMS. At block 1390, in response to the local SMS receiving a periodic polling request from a container within the local scope associated with the service, the renewed secrets are released by the local SMS to the container.

Example Distributed Computing Environment

Figure 14:
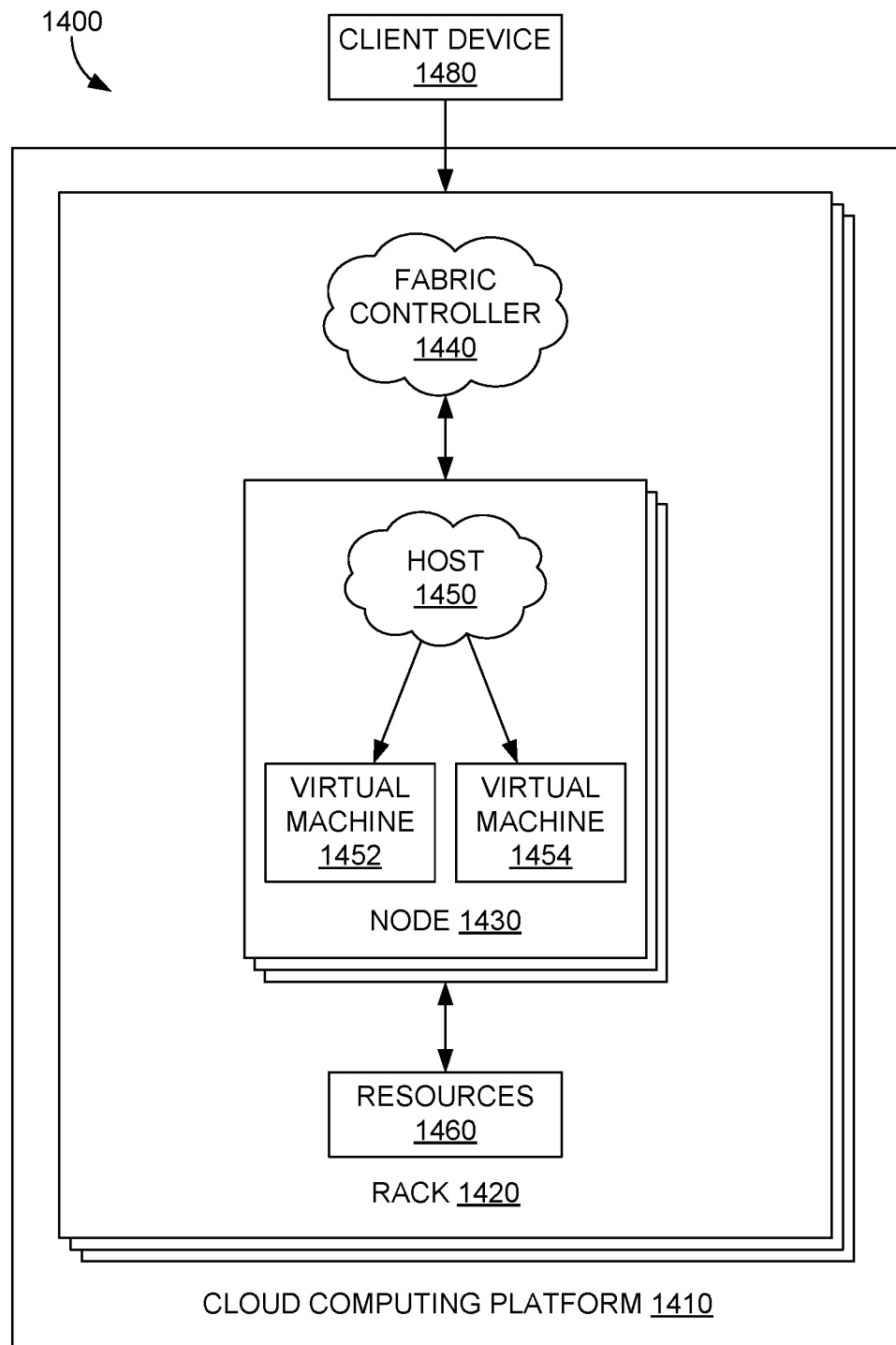
FIG. 14 is a block diagram of an example distributed computing environment suitable for use in implementing embodiments described herein.

Referring now to FIG. 14, FIG. 14 illustrates an example distributed computing environment 1400 in which implementations of the present disclosure may be employed. In particular, FIG. 14 shows a high level architecture of the secrets management system ("system") in cloud computing platform 1410, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 1400 that includes cloud computing platform 1410, rack 1420, and node 1430 (e.g., computing devices, processing units, or blades) in rack 1420. The system can be implemented with cloud computing platform 1410 that runs cloud services across different data centers and geographic regions. Cloud computing platform 1410 can implement fabric controller 1440 component for provisioning and managing resource allocation, deployment, upgrade, and management of cloud services. Typically, cloud computing platform 1410 acts to store data or run service applications in a distributed manner. Cloud computing infrastructure 1410 in a data center can be configured to host and support operation of endpoints of a particular service application. Cloud computing infrastructure 1410 may be a public cloud, a private cloud, or a dedicated cloud.

Node 1430 can be provisioned with host 1450 (e.g., operating system or runtime environment) running a defined software stack on node 1430. Node 1430 can also be configured to perform specialized functionality (e.g., compute nodes or storage nodes) within cloud computing platform 1410. Node 1430 is allocated to run one or more portions of a service application of a tenant. A tenant can refer to a customer utilizing resources of cloud computing platform 1410. Service application components of cloud computing platform 1410 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1430, nodes 1430 may be partitioned into virtual machines (e.g., virtual machine 1452 and virtual machine 1454). Physical machines can also concurrently run separate service applications. The virtual machines or physical machines can be configured as individualized computing environments that are supported by resources 1460 (e.g., hardware resources and software resources) in cloud computing platform 1410. It is contemplated that resources can be configured for specific service applications. Further, each service application may be divided into functional portions such that each functional portion is able to run on a separate virtual machine. In cloud computing platform 1410, multiple servers may be used to run service applications and perform data storage operations in a cluster. In particular, the servers may perform data operations independently but exposed as a single device referred to as a cluster. Each server in the cluster can be implemented as a node.

Client device 1480 may be linked to a service application in cloud computing platform 1410. Client device 1480 may be any type of computing device, which may correspond to computing device 1400 described with reference to FIG. 14, for example. Client device 1480 can be configured to issue commands to cloud computing platform 1410. In embodiments, client device 1480 may communicate with service applications through a virtual Internet Protocol (IP) and load balancer or other means that direct communication requests to designated endpoints in cloud computing platform 1410. The components of cloud computing platform 1410 may communicate with each other over a network (not shown), which may include, without limitation, one or more local area networks (LANs) and/or wide area networks (WANs).

Example Computing Environment

Figure 15:
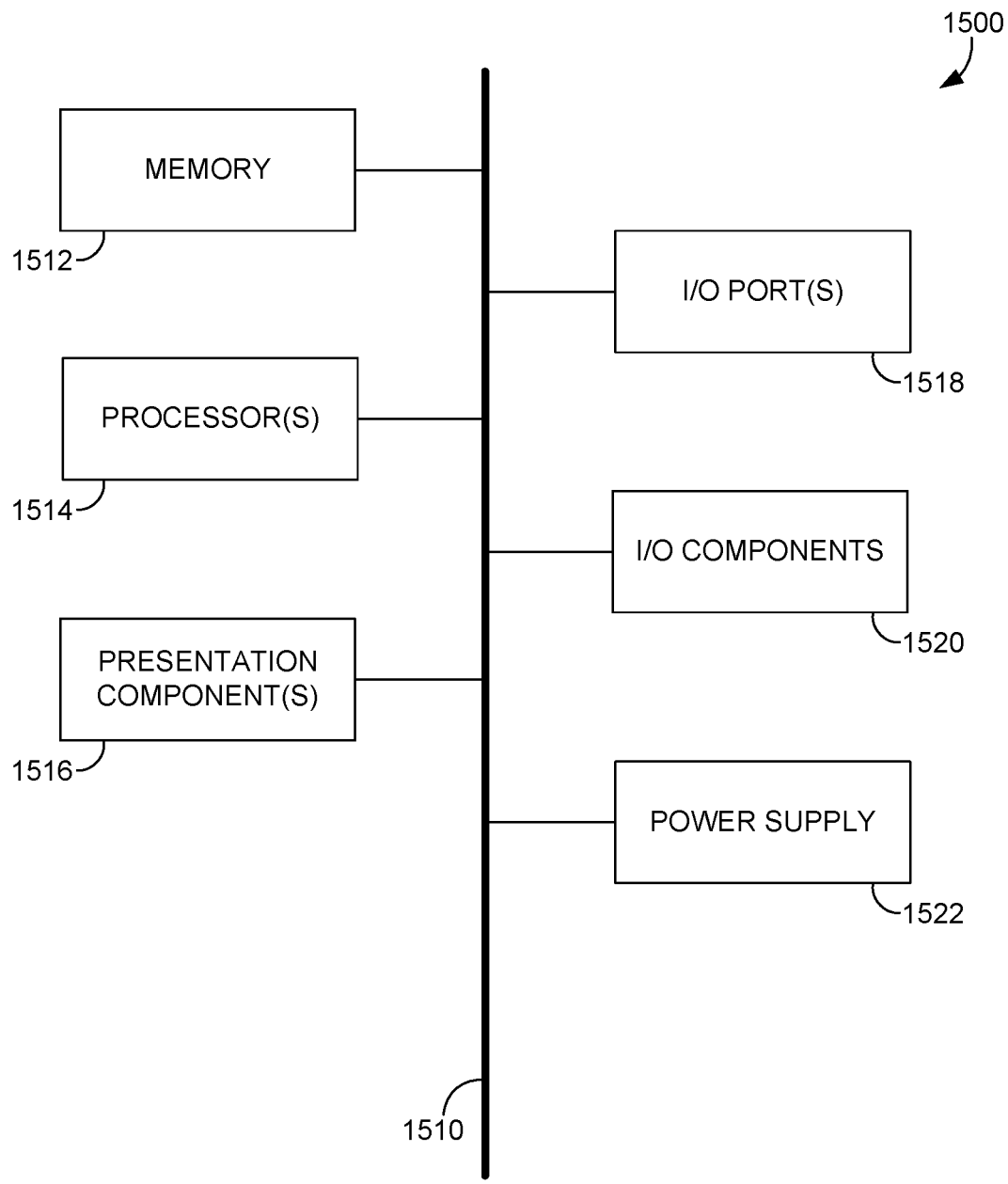
FIG. 15 is a block diagram of an example computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 15 in particular, an exemplary operating environment for implementing embodiments of the present invention is shown and designated generally as computing device 1500. Computing device 1500 is but one example of a suitable computing environment and is not intended to suggest any limitation as to the scope of use or functionality of the invention. Neither should computing device 1500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 15, computing device 1500 includes bus 1510 that directly or indirectly couples the following devices: memory 1512, one or more processors 1514, one or more presentation components 1516, input/output ports 1518, input/output components 1520, and illustrative power supply 1522. Bus 1510 represents what may be one or more buses (such as an address bus, data bus, or combination thereof). The various blocks of FIG. 15 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 15 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc.

With reference to the autonomous secrets management system, embodiments described herein support autonomous renewal and distribution of secrets. The autonomous secrets management system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the autonomous secrets management system can include an API library that includes specifications for routines, data structures, object classes, and variables may support the interaction between the hardware architecture of the device and the software framework of the autonomous secrets management system. These APIs include configuration specifications for the autonomous secrets management system such that the different components therein can communicate with each other in the autonomous secrets management system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous secrets management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for managing secrets, the method comprising:

receiving, from a customer of a provider of a distributed computing platform comprising nodes configured to execute a service application for the customer, at a secrets management service ("SMS") deployed in the distributed computing platform and configured to orchestrate secrets renewal and distribution to the nodes, a rollover policy for a secret of the service application;

installing the secret in a first secrets store of the SMS;

pushing the secret, from the SMS, during an initial deployment of the service application to an agent on a node of the nodes operated in the distributed computing platform by the provider, the initial deployment installing the secret in a second secrets store of the node;

automatically renewing the secret in the first secret store, by the SMS without being prompted by the node, pursuant to the rollover policy, thereby obtaining a renewed secret; and in response to receiving a periodic polling request from a credentials management component associated with the agent, releasing the renewed secret to the credentials management component.

2. The method of claim 1, wherein the service application is associated with a service model or a configuration file that references a location of the secret in the first secrets store instead of a version of the secret.

3. The method of claim 1, further comprising tracking, with the SMS, an internal state of the agent, wherein tracking comprises:

setting a first state of the agent indicating delivery of the renewed secret to the agent, in response to delivering the renewed secret to the agent; and setting a second state of the agent indicating the delivery is confirmed, in response to receiving, in a subsequent periodic polling request, metadata indicating the renewed secret is installed in the second secret store of the node.

4. The method of claim 3, further comprising tracking, with the SMS, a rollover of the renewed secret, wherein tracking the rollover comprises:

setting a first rollover state indicating the rollover has begun; and setting a second rollover state indicating the rollover is complete, in response to determining that a corresponding internal state for each of a plurality of agents associated with the service application has been set to the second state.

5. The method of claim 3, wherein tracking further comprises setting a third state of the agent indicating the renewed secret has been staged.

6. The method of claim 1, wherein the SMS is configured to deliver the secret packaged in a secure blob, wherein the secure blob is an opaque byte array containing the secret.

7. The method of claim 6, wherein the SMS is configured to version control the secure blob to facilitate a comparison of metadata from a subsequent periodic polling request indicating a first version of the secure blob installed in the second secret store of the node with metadata indicating a second version of the secure blob installed in the first secret store of the SMS.

* * * * *